United States Patent
Ni et al.

(10) Patent No.: US 11,327,631 B2
(45) Date of Patent: May 10, 2022

(54) METHOD FOR DISPLAYING APPLICATION STORAGE SPACE AND TERMINAL

(71) Applicant: Huawei Technologies Co., Ltd., Shenzhen (CN)

(72) Inventors: Jing Ni, Beijing (CN); Mengjiao Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 283 days.

(21) Appl. No.: 15/566,912

(22) PCT Filed: Apr. 16, 2015

(86) PCT No.: PCT/CN2015/076754
§ 371 (c)(1),
(2) Date: Oct. 16, 2017

(87) PCT Pub. No.: WO2016/165106
PCT Pub. Date: Oct. 20, 2016

(65) Prior Publication Data
US 2018/0095639 A1    Apr. 5, 2018

(51) Int. Cl.
*G06F 3/0481* (2022.01)
*G06T 11/00* (2006.01)
(Continued)

(52) U.S. Cl.
CPC ...... *G06F 3/04817* (2013.01); *G06F 3/04842* (2013.01); *G06F 3/04883* (2013.01);
(Continued)

(58) Field of Classification Search
CPC ............. G06F 3/04817; G06F 12/0891; G06F 2212/171; G06F 2212/60; G06T 11/001
See application file for complete search history.

(56) References Cited

U.S. PATENT DOCUMENTS 8,122,354 B1 * 2/2012 Torgerson ........... G06F 3/04895
715/710
2003/0084087 A1 * 5/2003 Berry .................... G06F 1/3231
718/102
(Continued)

FOREIGN PATENT DOCUMENTS

CN    1957343 A    5/2007
CN    102932532 A    2/2013
(Continued)

OTHER PUBLICATIONS

CN 201580075693.3, Office Action, dated Jun. 4, 2019.
(Continued)

*Primary Examiner* — Matthew Ell
*Assistant Examiner* — Samuel Shen
(74) *Attorney, Agent, or Firm* — Leydig, Voit & Mayer, Ltd.

(57) ABSTRACT

Embodiments of the present invention disclose a method for displaying application storage space and a terminal, so as to enable a user to intuitively learn a use state of application storage space, so that the storage space can be cleaned in time to ensure normal and efficient running of a terminal. The method in the embodiments of the present invention includes: first displaying, by a terminal, a first icon on a desktop in first display mode; and when determining that storage space used by a first application corresponding to the first icon is greater than a preset storage threshold, displaying, by the terminal, the first icon in preset display mode that is different from the first display mode.

12 Claims, 11 Drawing Sheets

(51) Int. Cl.
    *G06F 12/0891*      (2016.01)
    *G06F 3/04817*      (2022.01)
    *G06F 3/04883*      (2022.01)
    *G06F 3/04842*      (2022.01)

(52) U.S. Cl.
    CPC ........ *G06F 12/0891* (2013.01); *G06T 11/001* (2013.01); *G06F 2212/171* (2013.01); *G06F 2212/60* (2013.01)

(56) References Cited

U.S. PATENT DOCUMENTS

| | | | |
|---|---|---|---|
| 2004/0119757 A1* | 6/2004 | Corley | G06F 3/04817 715/837 |
| 2007/0079255 A1* | 4/2007 | Gourdol | G06F 9/451 715/815 |
| 2008/0046544 A1 | 2/2008 | Sakoh et al. | |
| 2008/0195972 A1* | 8/2008 | Lacey | G06F 3/0482 715/817 |
| 2010/0223619 A1 | 9/2010 | Jaquet et al. | |
| 2012/0260288 A1* | 10/2012 | Fujiki | H04L 67/10 725/39 |
| 2013/0097560 A1* | 4/2013 | Park | G06F 3/04817 715/811 |
| 2013/0212526 A1* | 8/2013 | Park | G06F 3/04817 715/808 |
| 2013/0254719 A1* | 9/2013 | Hanazaki | G06F 3/04817 715/846 |
| 2014/0007106 A1 | 1/2014 | Weksler et al. | |
| 2014/0026062 A1 | 1/2014 | Proudfoot et al. | |
| 2014/0089857 A1* | 3/2014 | Wang | G06F 3/04817 715/835 |
| 2014/0164928 A1* | 6/2014 | Kim | G06F 3/017 715/728 |
| 2014/0237378 A1* | 8/2014 | Gonen | H04M 1/72519 715/745 |
| 2014/0340344 A1 | 11/2014 | Yamada | |
| 2015/0033129 A1* | 1/2015 | Cho | G06F 3/167 715/728 |
| 2015/0082247 A1 | 3/2015 | Iwanaga et al. | |
| 2015/0091936 A1* | 4/2015 | Peng | G09G 5/00 345/590 |
| 2015/0113452 A1* | 4/2015 | Tullysmith | G06F 16/168 715/765 |
| 2015/0134913 A1* | 5/2015 | Huang | G06F 12/121 711/135 |
| 2016/0335191 A1* | 11/2016 | Dong | G06F 12/0891 |

FOREIGN PATENT DOCUMENTS

| | | |
|---|---|---|
| CN | 103559299 A | 2/2014 |
| CN | 103714016 A | 4/2014 |
| CN | 104137066 A | 11/2014 |
| GN | 102508599 A | 6/2012 |
| JP | S62249225 A | 10/1987 |
| JP | H05265689 A | 10/1993 |
| JP | H064258 A | 1/1994 |
| JP | H06342361 A | 12/1994 |
| JP | H08115199 A | 5/1996 |
| JP | H09128206 A | 5/1997 |
| JP | 2008512745 A | 4/2008 |
| JP | 2011151510 A | 8/2011 |
| JP | 2012058907 A | 3/2012 |
| JP | 2014021701 A | 2/2014 |
| KR | 20080067113 A | 7/2008 |
| KR | 20150025754 A * | 3/2015 |
| WO | 2006028460 A2 | 3/2006 |
| WO | 2014155730 A1 | 10/2014 |

OTHER PUBLICATIONS

Swenson, "My favorite ways to use Windows Touch", XP055015284, pp. 1-12, Retrieved from the Internet:URL: http://web.archive.org/web/20100114145830/http://windows.microsoft.com/en-us/windows7/my-favorite-ways-to-use-touch,dated (Downloaded Dec. 12, 2011).

* cited by examiner

METHOD FOR DISPLAYING APPLICATION STORAGE SPACE AND TERMINAL

CROSS-REFERENCE TO RELATED APPLICATIONS

This application is a U.S. National Stage Application of International Application No. PCT/CN2015/076754, filed on Apr. 16, 2015, which is hereby incorporated by reference in its entirety.

TECHNICAL FIELD

The present invention relates to the field of mobile devices, and in particular, to a method for displaying application storage space and a terminal.

BACKGROUND

Many applications may be installed on people's terminal (such as a mobile phone or a tablet computer), and many caches that need to be cleaned are generated during use of the applications. When the caches that need to be cleaned occupy excessively large storage space, running of the terminal is affected.

Currently, if storage space of an application is to be cleaned, a setting interface of the application needs to be entered, so as to find a storage space cleaning button and manually clean the storage space.

However, in actual application, a storage space cleaning button is generally hidden in a relatively deep level of a setting interface of an application. It is difficult for a user to find this storage space cleaning function, and it is difficult for the user to be aware that storage space of the application needs to be cleaned. Therefore, running of the terminal is often affected because the storage space is not cleaned in time.

SUMMARY

Embodiments of the present invention provide a method for displaying application storage space and a terminal, so as to enable a user to intuitively learn a use state of application storage space, so that the storage space can be cleaned in time to ensure normal and efficient running of a terminal.

A first aspect of the embodiments of the present invention provides a method for displaying application storage space, including:

displaying, by a terminal, a first icon on a desktop in first display mode;

determining, by the terminal, whether storage space used by a first application is greater than a preset storage threshold of the first application, where the first icon is corresponding to one or more applications, and the first application is any one of the applications corresponding to the first icon; and displaying, by the terminal, the first icon in preset display mode when determining that the storage space used by the first application is greater than the preset storage threshold, where the preset display mode is different from the first display mode.

With reference to the first aspect of the embodiments of the present invention, in a first implementation manner of the first aspect of the embodiments of the present invention, the displaying, by a terminal, a first icon on a desktop in first display mode specifically includes:

displaying, by the terminal, the first icon on the desktop according to a first area; and the displaying, by the terminal, the first icon in preset display mode specifically includes:

displaying, by the terminal, the first icon on the desktop according to a second area, where the second area is greater than the first area.

With reference to the first aspect of the embodiments of the present invention, in a second implementation manner of the first aspect of the embodiments of the present invention, the displaying, by a terminal, a first icon on a desktop in first display mode specifically includes:

displaying, by the terminal, the first icon on the desktop according to first color intensity; and the displaying, by the terminal, the first icon in preset display mode specifically includes:

displaying, by the terminal, the first icon on the desktop according to second color intensity, where the second color intensity is greater than the first color intensity.

With reference to the first aspect of the embodiments of the present invention, in a third implementation manner of the first aspect of the embodiments of the present invention, after the step of displaying, by the terminal, the first icon in preset display mode, the method further includes:

detecting, by the terminal, a first operation performed on the first icon; and cleaning, by the terminal, storage space of a cleaning-required application or storage space of all the applications when the first operation matches a preset cleaning operation, where the cleaning-required application refers to an application that uses storage space greater than a preset storage threshold and that is in the applications corresponding to the first icon, and all the applications refer to all the applications corresponding to the first icon.

With reference to the first implementation manner of the first aspect of the embodiments of the present invention, in a fourth implementation manner of the first aspect of the embodiments of the present invention, after the step of displaying, by the terminal, the first icon on the desktop according to a second area, the method further includes:

detecting, by the terminal, a first operation performed on the first icon;

when the first operation matches a preset cleaning operation, releasing storage space of a cleaning-required application or storage space of all the applications, and displaying, on the desktop in real time, space release progress of the cleaning-required application or space release progress of all the applications, where the cleaning-required application refers to an application that uses storage space greater than a preset storage threshold and that is in the applications corresponding to the first icon, and all the applications refer to all the applications corresponding to the first icon; and when determining that a user stops performing the operation on the first icon, reducing, by the terminal, an area of the first icon according to current space release progress of the cleaning-required application or current space release progress of all the applications by using the first area as a target, and displaying the first icon according to a third area obtained after the reduction, where the third area is not less than the first area.

With reference to the second implementation manner of the first aspect of the embodiments of the present invention, in a fifth implementation manner of the first aspect of the embodiments of the present invention, after the step of displaying, by the terminal, the first icon on the desktop according to second color intensity, the method further includes:

detecting, by the terminal, a first operation performed on the first icon;

when the first operation matches a preset cleaning operation, releasing storage space of a cleaning-required application or storage space of all the applications, and displaying, on the desktop in real time, space release progress of the cleaning-required application or space release progress of all the applications, where the cleaning-required application refers to an application that uses storage space greater than a preset storage threshold and that is in the applications corresponding to the first icon, and all the applications refer to all the applications corresponding to the first icon; and when determining that a user stops performing the operation on the first icon, reducing, by the terminal, color intensity of the first icon according to current space release progress of the cleaning-required application or current space release progress of all the applications by using the first color intensity as a target, and displaying the first icon according to the reduced second color intensity, where the second color intensity is not less than the first color intensity.

With reference to any one of the third implementation manner to the fifth implementation manner of the first aspect of the embodiments of the present invention, in a sixth implementation manner of the first aspect of the embodiments of the present invention, the preset cleaning operation is an operation of selecting and continuously shaking an icon by the user in an editing state of the desktop.

A second aspect of the embodiments of the present invention provides a terminal, including:

a first display module, configured to display a first icon on a desktop in first display mode;

a determining module, configured to determine whether storage space used by a first application is greater than a preset storage threshold of the first application, where the first icon is corresponding to one or more applications, and the first application is any one of the applications corresponding to the first icon; and a second display module, configured to display the first icon in preset display mode when the determining module determines that the storage space used by the first application is greater than the preset storage threshold, where the preset display mode is different from the first display mode.

With reference to the second aspect of the embodiments of the present invention, in a first implementation manner of the second aspect of the embodiments of the present invention, the first display module is specifically configured to display the first icon on the desktop according to a first area; and the second display module is specifically configured to display the first icon on the desktop according to a second area when the determining module determines that the storage space used by the first application is greater than the preset storage threshold, where the second area is greater than the first area.

With reference to the second aspect of the embodiments of the present invention, in a second implementation manner of the second aspect of the embodiments of the present invention, the first display module is specifically configured to display the first icon on the desktop according to first color intensity; and the second display module is specifically configured to display the first icon on the desktop according to second color intensity, where the second color intensity is greater than the first color intensity.

With reference to the second aspect of the embodiments of the present invention, in a third implementation manner of the second aspect of the embodiments of the present invention, the terminal further includes:

a detection module, configured to detect a first operation performed on the first icon; and a first cleaning module, configured to clean storage space of a cleaning-required application when the first operation detected by the detection module matches a preset cleaning operation, where the cleaning-required application refers to an application that uses storage space greater than a preset storage threshold and that is in the applications corresponding to the first icon; or a second cleaning module, configured to clean storage space of all the applications when the first operation detected by the detection module matches a preset cleaning operation, where the cleaning-required application refers to an application that uses storage space greater than a preset storage threshold and that is in the applications corresponding to the first icon, and all the applications refer to all the applications corresponding to the first icon.

With reference to the first implementation manner of the second aspect of the embodiments of the present invention, in a fourth implementation manner of the second aspect of the embodiments of the present invention, the terminal further includes:

a detection module, configured to detect a first operation performed on the first icon;

a first release module, configured to: when the first operation detected by the detection module matches a preset cleaning operation, release storage space of a cleaning-required application or storage space of all the applications, and display, on the desktop in real time, space release progress of the cleaning-required application or space release progress of all the applications, where the cleaning-required application refers to an application that uses storage space greater than a preset storage threshold and that is in the applications corresponding to the first icon, and all the applications refer to all the applications corresponding to the first icon; and a third display module, configured to: when the detection module determines that a user stops performing the operation on the first icon, reduce an area of the first icon according to current space release progress of the cleaning-required application or current space release progress of all the applications by using the first area as a target, and display the first icon according to a third area obtained after the reduction, where the third area is not less than the first area.

With reference to the second implementation manner of the second aspect of the embodiments of the present invention, in a fifth implementation manner of the second aspect of the embodiments of the present invention, the terminal further includes:

a detection module, configured to detect a first operation performed on the first icon;

a second release module, configured to: when the first operation detected by the detection module matches a preset cleaning operation, release storage space of a cleaning-required application or storage space of all the applications, and display, on the desktop in real time, space release progress of the cleaning-required application or space release progress of all the applications, where the cleaning-required application refers to an application that uses storage space greater than a preset storage threshold and that is in the applications corresponding to the first icon, and all the applications refer to all the applications corresponding to the first icon; and a fourth display module, configured to: when the detection module determines that a user stops performing the operation on the first icon, reduce color intensity of the first icon according to current space release progress of the cleaning-required application or current space release progress of all the applications by using the first color intensity as a target, and display the first icon according to the reduced second color intensity, where the second color intensity is not less than the first color intensity.

With reference to any one of the third implementation manner to the fifth implementation manner of the second aspect of the embodiments of the present invention, in a sixth implementation manner of the second aspect of the embodiments of the present invention, the preset cleaning operation is an operation of selecting and continuously shaking an icon by the user in an editing state of the desktop.

A third aspect of the embodiments of the present invention provides a terminal, including:

a display screen, a processor, a memory, and an input apparatus, where:

the display screen is used as an output interface between the terminal and a user, and displays visual output for the user;

the input apparatus is configured to receive an operation of the user; and the processor is configured to perform the following steps by invoking an operation instruction stored in the memory:

instructing the display screen to display a first icon on a desktop in first display mode;

determining whether storage space used by a first application is greater than a preset storage threshold of the first application, where the first icon is corresponding to one or more applications, and the first application is any one of the applications corresponding to the first icon; and when determining that the storage space used by the first application is greater than the preset storage threshold, instructing the display screen to display the first icon in preset display mode, where the preset display mode is different from the first display mode.

With reference to the third aspect of the embodiments of the present invention, in a first implementation manner of the third aspect of the embodiments of the present invention, when performing the step of instructing the display screen to display a first icon on a desktop in first display mode, the processor specifically performs the following step:

instructing the display screen to display the first icon on the desktop according to a first area; and when performing the step of instructing the display screen to display the first icon in preset display mode, the processor specifically performs the following step:

instructing the display screen to display the first icon on the desktop according to a second area, where the second area is greater than the first area.

With reference to the third aspect of the embodiments of the present invention, in a second implementation manner of the third aspect of the embodiments of the present invention, when performing the step of instructing the display screen to display a first icon on a desktop in first display mode, the processor specifically performs the following step:

instructing the display screen to display the first icon on the desktop according to first color intensity; and when performing the step of instructing the display screen to display the first icon in preset display mode, the processor specifically performs the following step:

instructing the display screen to display the first icon on the desktop according to second color intensity, where the second color intensity is greater than the first color intensity.

With reference to the third aspect of the embodiments of the present invention, in a third implementation manner of the third aspect of the embodiments of the present invention, the processor is further configured to perform the following steps:

detecting a first operation that is performed by the user on the first icon and received by the input apparatus; and cleaning storage space of a cleaning-required application or storage space of all the applications when the detected first operation matches a preset cleaning operation, where the cleaning-required application refers to an application that uses storage space greater than a preset storage threshold and that is in the applications corresponding to the first icon, and all the applications refer to all the applications corresponding to the first icon.

With reference to the first implementation manner of the third aspect of the embodiments of the present invention, in a fourth implementation manner of the third aspect of the embodiments of the present invention, the processor is further configured to perform the following steps:

detecting a first operation that is performed by the user on the first icon and received by the input apparatus;

when the detected first operation matches a preset cleaning operation, releasing storage space of a cleaning-required application or storage space of all the applications, and instructing the display screen to display, on the desktop in real time, space release progress of the cleaning-required application or space release progress of all the applications, where the cleaning-required application refers to an application that uses storage space greater than a preset storage threshold and that is in the applications corresponding to the first icon, and all the applications refer to all the applications corresponding to the first icon; and when determining that the user stops performing the operation on the first icon, reducing an area of the first icon according to current space release progress of the cleaning-required application or current space release progress of all the applications by using the first area as a target, and instructing the display screen to display the first icon according to a third area obtained after the reduction, where the third area is not less than the first area.

With reference to the second implementation manner of the third aspect of the embodiments of the present invention, in a fifth implementation manner of the third aspect of the embodiments of the present invention, the processor is further configured to perform the following steps:

detecting a first operation that is performed by the user on the first icon and received by the input apparatus;

when the detected first operation matches a preset cleaning operation, releasing storage space of a cleaning-required application or storage space of all the applications, and instructing the display screen to display, on the desktop in real time, space release progress of the cleaning-required application or space release progress of all the applications, where the cleaning-required application refers to an application that uses storage space greater than a preset storage threshold and that is in the applications corresponding to the first icon, and all the applications refer to all the applications corresponding to the first icon; and when determining that the user stops performing the operation on the first icon, reducing color intensity of the first icon according to current space release progress of the cleaning-required application or current space release progress of all the applications by using the first color intensity as a target, and instructing the display screen to display the first icon according to the reduced second color intensity, where the second color intensity is not less than the first color intensity.

With reference to any one of the third implementation manner to the fifth implementation manner of the third aspect of the embodiments of the present invention, in a sixth implementation manner of the third aspect of the embodiments of the present invention, the preset cleaning operation is an operation of selecting and continuously shaking an icon by the user in an editing state of the desktop.

A fourth aspect of the embodiments of the present invention provides a graphical user interface on a terminal device, where the terminal device includes a display screen, a memory, multiple application programs, and one or more processors configured to execute one or more programs stored in the memory, and the graphical user interface includes:

an interface used to display an application interface element, where:

the interface used to display the application interface element includes:

displaying a first icon on the display screen in first display mode, where the first icon is corresponding to one or more application programs; and displaying the first icon in preset display mode in response to detecting that storage space used by a first application is greater than a preset storage threshold, where the first application is any one of the application programs corresponding to the first icon, and the preset display mode is different from the first display mode.

With reference to the fourth aspect of the embodiments of the present invention, in a first implementation manner of the fourth aspect of the embodiments of the present invention, the displaying a first icon on the display screen in first display mode specifically includes:

displaying the first icon on a desktop of the terminal device according to a first area; and the displaying the first icon in preset display mode specifically includes:

displaying the first icon on the desktop according to a second area, where the second area is greater than the first area.

With reference to the fourth aspect of the embodiments of the present invention, in a second implementation manner of the fourth aspect of the embodiments of the present invention, the displaying a first icon on the display screen in first display mode specifically includes:

displaying the first icon on a desktop of the terminal device according to first color intensity; and the displaying the first icon in preset display mode specifically includes:

displaying the first icon on the desktop according to second color intensity, where the second color intensity is greater than the first color intensity.

With reference to the first implementation manner of the fourth aspect of the embodiments of the present invention, in a third implementation manner of the fourth aspect of the embodiments of the present invention, after the step of displaying the first icon on the desktop according to a second area, the interface used to display the application interface element further includes:

displaying, on the desktop in real time, space release progress of a cleaning-required application or space release progress of all the applications in response to detecting that a first operation performed on the first icon matches a preset cleaning operation, where the cleaning-required application refers to an application that uses storage space greater than a preset storage threshold and that is in the applications corresponding to the first icon, and all the applications refer to all the applications corresponding to the first icon; and in response to detecting that the first operation is stopped, reducing an area of the first icon according to current space release progress of the cleaning-required application or current space release progress of all the applications by using the first area as a target, and displaying the first icon according to a third area obtained after the reduction, where the third area is not less than the first area.

With reference to the second implementation manner of the fourth aspect of the embodiments of the present invention, in a fourth implementation manner of the fourth aspect of the embodiments of the present invention, after the step of displaying the first icon on the desktop according to second color intensity, the interface used to display the application interface element further includes:

displaying, on the desktop in real time, space release progress of a cleaning-required application or space release progress of all the applications in response to detecting that a first operation performed on the first icon matches a preset cleaning operation, where the cleaning-required application refers to an application that uses storage space greater than a preset storage threshold and that is in the applications corresponding to the first icon, and all the applications refer to all the applications corresponding to the first icon; and in response to detecting that the first operation is stopped, reducing color intensity of the first icon according to current space release progress of the cleaning-required application or current space release progress of all the applications by using the first color intensity as a target, and displaying the first icon according to the reduced second color intensity, where the second color intensity is not less than the first color intensity.

A fifth aspect of the embodiments of the present invention provides a computer-readable storage medium that stores one or more programs, where the one or more programs include an instruction, when an electronic device that includes a display and multiple application programs executes the instruction, the electronic device is enabled to perform the method according to claims 1 to 7, and the display includes a display screen.

A sixth aspect of the embodiments of the present invention provides an information processing apparatus used in an electronic device that includes a display and multiple application programs, where the display includes a display screen, and the information processing apparatus includes:

an apparatus configured to display a first icon on the display screen in first display mode;

an apparatus configured to determine whether storage space used by a first application is greater than a preset storage threshold of the first application, where the first icon is corresponding to one or more applications, and the first application is any one of the applications corresponding to the first icon; and an apparatus configured to display the first icon in preset display mode when it is determined that the storage space used by the first application is greater than the preset storage threshold, where the preset display mode is different from the first display mode.

With reference to the sixth aspect of the embodiments of the present invention, in a first implementation manner of the sixth aspect of the embodiments of the present invention, the apparatus configured to display a first icon on the display screen in first display mode is specifically:

an apparatus configured to display the first icon on a desktop display interface of the display screen according to a first area; and the apparatus configured to display the first icon in preset display mode is specifically:

an apparatus configured to display the first icon on the desktop according to a second area, where the second area is greater than the first area.

With reference to the sixth aspect of the embodiments of the present invention, in a second implementation manner of the sixth aspect of the embodiments of the present invention, the apparatus configured to display a first icon on the display screen in first display mode is specifically:

an apparatus configured to display the first icon on a desktop display interface of the display screen according to first color intensity; and the apparatus configured to display the first icon in preset display mode is specifically:

an apparatus configured to display the first icon on the desktop according to second color intensity, where the second color intensity is greater than the first color intensity.

With reference to the sixth aspect of the embodiments of the present invention, in a third implementation manner of the sixth aspect of the embodiments of the present invention, the information processing apparatus further includes:

an apparatus configured to detect a first operation performed on the first icon; and an apparatus configured to clean storage space of a cleaning-required application or storage space of all the applications when the first operation matches a preset cleaning operation, where the cleaning-required application refers to an application that uses storage space greater than a preset storage threshold and that is in the applications corresponding to the first icon, and all the applications refer to all the applications corresponding to the first icon.

With reference to the first implementation manner of the sixth aspect of the embodiments of the present invention, in a fourth implementation manner of the sixth aspect of the embodiments of the present invention, the information processing apparatus further includes:

an apparatus configured to detect a first operation performed on the first icon;

an apparatus configured to: when the first operation matches a preset cleaning operation, release storage space of a cleaning-required application or storage space of all the applications, and display, on the desktop in real time, space release progress of the cleaning-required application or space release progress of all the applications, where the cleaning-required application refers to an application that uses storage space greater than a preset storage threshold and that is in the applications corresponding to the first icon, and all the applications refer to all the applications corresponding to the first icon; and an apparatus configured to: when it is determined that a user stops performing the operation on the first icon, reduce an area of the first icon according to current space release progress of the cleaning-required application or current space release progress of all the applications by using the first area as a target, and display the first icon according to a third area obtained after the reduction, where the third area is not less than the first area.

With reference to the second implementation manner of the sixth aspect of the embodiments of the present invention, in a fifth implementation manner of the sixth aspect of the embodiments of the present invention, the information processing apparatus further includes:

an apparatus configured to detect a first operation performed on the first icon;

an apparatus configured to: when the first operation matches a preset cleaning operation, release storage space of a cleaning-required application or storage space of all the applications, and display, on the desktop in real time, space release progress of the cleaning-required application or space release progress of all the applications, where the cleaning-required application refers to an application that uses storage space greater than a preset storage threshold and that is in the applications corresponding to the first icon, and all the applications refer to all the applications corresponding to the first icon; and an apparatus configured to: when it is determined that a user stops performing the operation on the first icon, reduce color intensity of the first icon according to current space release progress of the cleaning-required application or current space release progress of all the applications by using the first color intensity as a target, and display the first icon according to the reduced second color intensity, where the second color intensity is not less than the first color intensity.

A seventh aspect of the embodiments of the present invention provides a graphical user interface on an electronic device, where the electronic device includes a display, a memory, multiple application programs, and one or more processors configured to execute one or more programs stored in the memory, the graphical user interface includes a user interface displayed by using the method according to any one of the first aspect of the embodiments of the present invention to the sixth implementation manner of the first aspect, and the display includes a display screen.

An eighth aspect of the embodiments of the present invention provides an electronic apparatus, including:

a display, where the display includes a display screen;

one or more processors;

a memory;

multiple application programs; and one or more programs, where the one or more programs are stored in the memory and configured to be executed by the one or more processors, and the one or more programs include an instruction used to perform the method according to any one of the first aspect of the embodiments of the present invention to the sixth implementation manner of the first aspect.

A ninth aspect of the embodiments of the present invention provides an information processing apparatus used in an electronic device, where the electronic device includes a display and multiple application programs, and the information processing apparatus includes:

an apparatus configured to perform the method according to any one of the first aspect of the embodiments of the present invention to the sixth implementation manner of the first aspect, where the display includes a display screen.

It may be learned from the foregoing technical solutions that the embodiments of the present invention have the following advantages: In the embodiments of the present invention, a terminal first displays a first icon on a desktop in first display mode, and when determining that storage space used by a first application corresponding to the first icon is greater than a preset storage threshold, the terminal displays the first icon in preset display mode that is different from the first display mode, so that a display effect of the first icon in this case is different from that achieved when the used storage space is not greater than the preset storage threshold. In this way, when the used storage space is greater than the preset storage threshold, that is, when storage space of the first application corresponding to the first icon needs to be cleaned, the first icon is directly displayed on the desktop in a different display mode. A user can intuitively learn a use state of application storage space according to a difference in display of icons on the desktop, and the user is reminded that storage space of an application needs to be cleaned. Therefore, storage space of an application that uses storage space greater than a preset storage threshold can be cleaned in time, which ensures normal and efficient running of the terminal, and improves human-computer interaction intelligence of the terminal.

DESCRIPTION OF EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by persons skilled in the art based on the embodiments of the present invention without creative efforts shall fall within the protection scope of the present invention.

Figure 1:
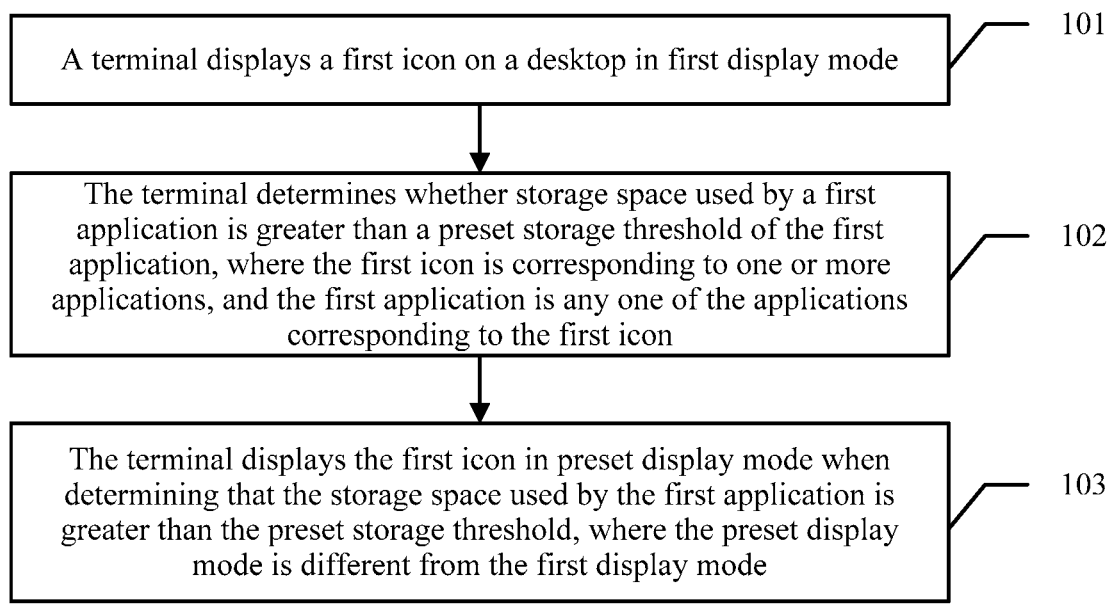
FIG. 1 is a schematic flowchart of a method for displaying application storage space according to an embodiment of the present invention.

Referring to FIG. 1, an embodiment of a method for displaying application storage space in the embodiments of the present invention includes the following steps.

101. A terminal displays a first icon on a desktop in first display mode.

In this step, the first icon may be an icon of a single application on the desktop, or may be a folder icon that includes multiple application icons on the desktop, which is not limited herein.

102. The terminal determines whether storage space used by a first application is greater than a preset storage threshold of the first application, where the first icon is corresponding to one or more applications, and the first application is any one of the applications corresponding to the first icon.

In this step, the first icon is corresponding to one or more applications. If the first icon is an icon of a single application on the desktop, the first application is the only application corresponding to the first icon. If the first icon is a folder icon that includes multiple application icons on the desktop, the first application refers to any one of the applications corresponding to the first icon.

It should be noted that each application may have a different preset cleaning threshold according to factors such as a function implemented by each application and use frequency of each application. The preset cleaning threshold may be a recommendation value provided by a manufacturer, or may be self-defined by a user, which is not limited herein. Certainly, one threshold may be set for all the applications. That is, the applications may be corresponding to different thresholds or a same threshold.

It may be understood that the storage space used by the first application is not greater than the preset storage threshold of the first application when step 101 is performed. With an increase in a use time of the terminal and continuous running of each application, the terminal may determine, at a fixed time/by means of polling or by using a specified interruption condition, whether the storage space used by the first application is greater than the preset storage threshold of the first application. If the storage space used by the first application is not greater than the preset storage threshold of the first application, step 101 continues to be performed. If the storage space used by the first application is greater than the preset storage threshold of the first application, step 103 may be performed.

103. The terminal displays the first icon in preset display mode when determining that the storage space used by the first application is greater than the preset storage threshold, where the preset display mode is different from the first display mode.

In this step, when the first icon is an icon of a single application, when determining that the storage space used by the first application to which the first icon uniquely corresponds is greater than the preset storage threshold, the terminal displays the first icon in preset display mode that is different from the first display mode. When the first icon is a folder icon that includes multiple application icons, when determining that storage space used by any one (the first application) of the multiple applications corresponding to the first icon is greater than a preset storage threshold, the terminal displays the first icon in preset display mode. For example, the first icon is displayed in an icon size different from that in first display mode, the first icon is displayed by adding a shadow or another pattern that the first display mode does not have, or the first icon is displayed with icon color intensity different from that in first display mode.

It may be understood that step 101 to step 103 is a process that varies with the use time of the terminal and application running duration. In an initial state, the storage space used by the first application is relatively small, the storage space does not need to be cleaned, and the terminal displays, in first display mode, the first icon corresponding to the first application. As running duration of the first application increases, larger storage space is used. When the storage space used by the first application is greater than the preset storage threshold, it indicates that the storage space of the first application needs to be cleaned. The terminal displays, in preset display mode, the first icon corresponding to the first application, so as to distinguish the first icon from an icon corresponding to another application whose storage space does not need to be cleaned.

In this embodiment of the present invention, a terminal first displays a first icon on a desktop in first display mode, and when determining that storage space used by a first application corresponding to the first icon is greater than a preset storage threshold, the terminal displays the first icon in preset display mode that is different from the first display mode, so that a display effect of the first icon in this case is different from that achieved when the used storage space is not greater than the preset storage threshold. In this way, when the used storage space is greater than the preset storage threshold, that is, when storage space of the first application corresponding to the first icon needs to be cleaned, the first icon is directly displayed on the desktop in a different display mode. A user can intuitively learn a use state of application storage space according to a difference in display of icons on the desktop, and the user is reminded that storage space of an application needs to be cleaned. Therefore, storage space of an application that uses storage space greater than a preset storage threshold can be cleaned in time, which ensures normal and efficient running of the terminal, and improves human-computer interaction performance of the terminal.

In actual application, after the terminal displays the first icon in preset display mode, the user may further directly perform an operation on the first icon on the desktop, so as to clean the storage space of the first application. It may be understood that, if the first icon is an icon of a single application, the storage space of the first application may be directly cleaned. If the first icon is a folder icon that includes multiple application icons, the terminal may clean only storage space of a cleaning-required application in applications corresponding to the first icon, or may clean storage space of all applications corresponding to the first icon, which is not limited herein. The following describes the method for displaying application storage space in this embodiment of the present invention by using these two cases.

Figure 2:
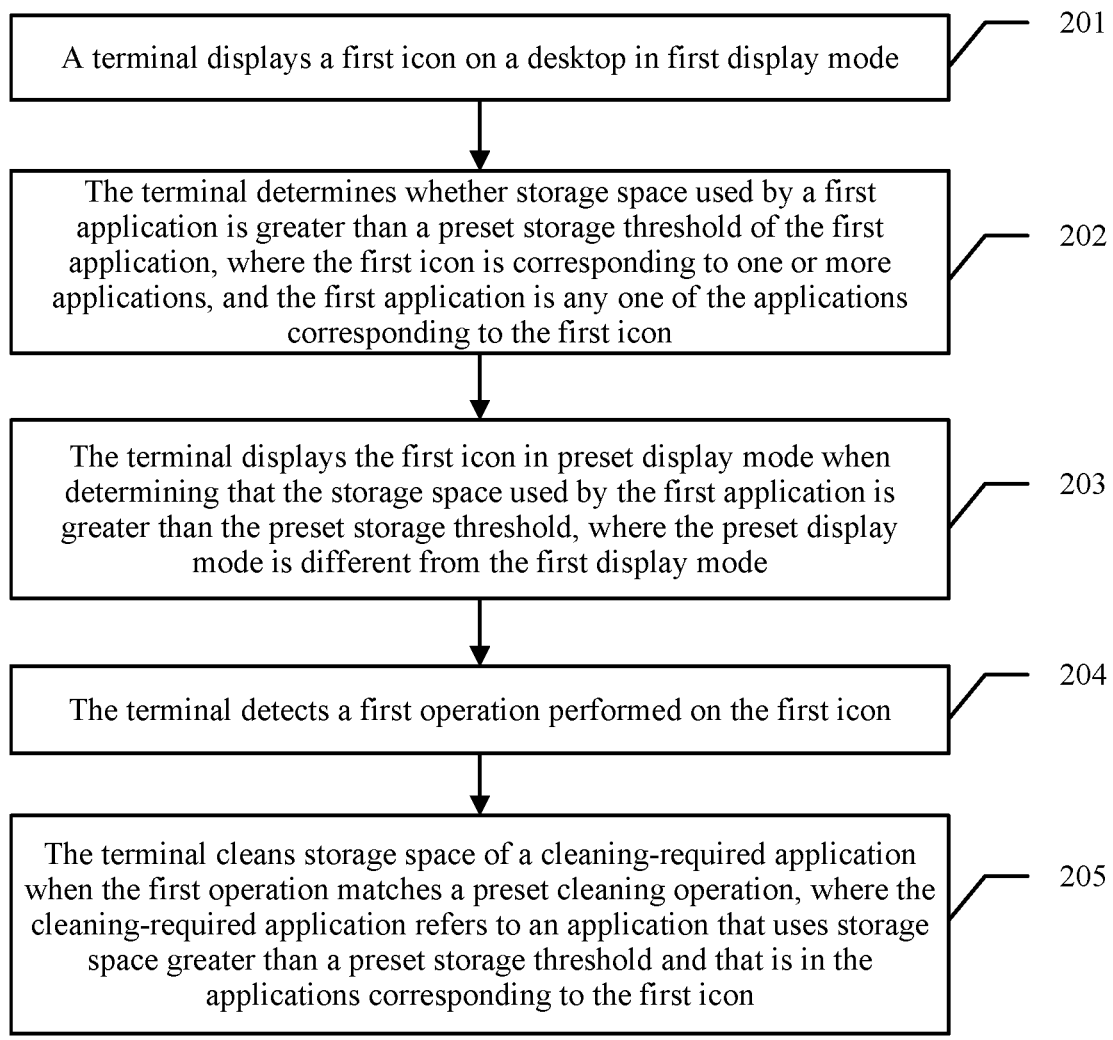
FIG. 2 is another schematic flowchart of a method for displaying application storage space according to an embodiment of the present invention.

Referring to FIG. 2, another embodiment of a method for displaying application storage space in the embodiments of the present invention includes the following steps.

201. A terminal displays a first icon on a desktop in first display mode.

202. The terminal determines whether storage space used by a first application is greater than a preset storage threshold of the first application, where the first icon is corresponding to one or more applications, and the first application is any one of the applications corresponding to the first icon.

203. The terminal displays the first icon in preset display mode when determining that the storage space used by the first application is greater than the preset storage threshold, where the preset display mode is different from the first display mode.

Step 201 to step 203 are similar to step 101 to step 103, and details are not described herein.

204. The terminal detects a first operation performed on the first icon.

The terminal displays the first icon on the desktop in preset display mode that is different from the first display mode. After learning a difference between the first icon and another icon, a user can be aware that storage space of an application corresponding to the first icon needs to be cleaned. The user performs the first operation on the first icon on the desktop, and the terminal detects the first operation performed on the first icon.

It should be noted that an object of the first operation herein is the first icon on the desktop, which is significantly different from performing an operation on a storage space cleaning button in a relatively deep level of a setting interface of an application in the prior art.

205. The terminal cleans storage space of a cleaning-required application when the first operation matches a preset cleaning operation, where the cleaning-required application refers to an application that uses storage space greater than a preset storage threshold and that is in the applications corresponding to the first icon.

In this step, when the first operation performed on the first icon matches the preset cleaning operation, the terminal performs cleaning on the application that uses the storage space greater than the preset storage threshold and that is in the applications corresponding to the first icon. It may be understood that, if the first icon is an icon corresponding a single application, the cleaning-required application is the foregoing first application. If the first icon is a folder icon that includes multiple application icons, the cleaning-required application may be the foregoing first application, or may be multiple applications that all use storage space greater than preset storage thresholds, where the multiple applications include the foregoing first application.

It may be understood that, according to an actual demand of the user, the preset cleaning operation may be set to many types of operations, may be factory default, or may be self-defined by the user. For example, the preset cleaning operation may be an operation of touching and holding an icon in an editing state of the desktop to continuously shake the icon, an operation of keeping touching and holding an icon, an operation of touching and holding an icon in an editing state of the desktop to draw a circle, an operation of selecting an icon and shaking a mobile phone, or an operation of suspending a selected icon and shaking the icon or shaking a mobile phone, which is not limited herein.

In this embodiment of the present invention, a user can perform an operation on a first icon directly on a desktop to clean storage space of a cleaning-required application, and no longer needs to search a deep level of an application program interface for a storage space cleaning button, which simplifies a user operation and improves human-computer interaction performance. In addition, cleaning is performed on a targeted application that uses storage space greater than a preset storage threshold and that is in applications corresponding to the first icon, which ensures normal and efficient running of a terminal.

Figure 3:
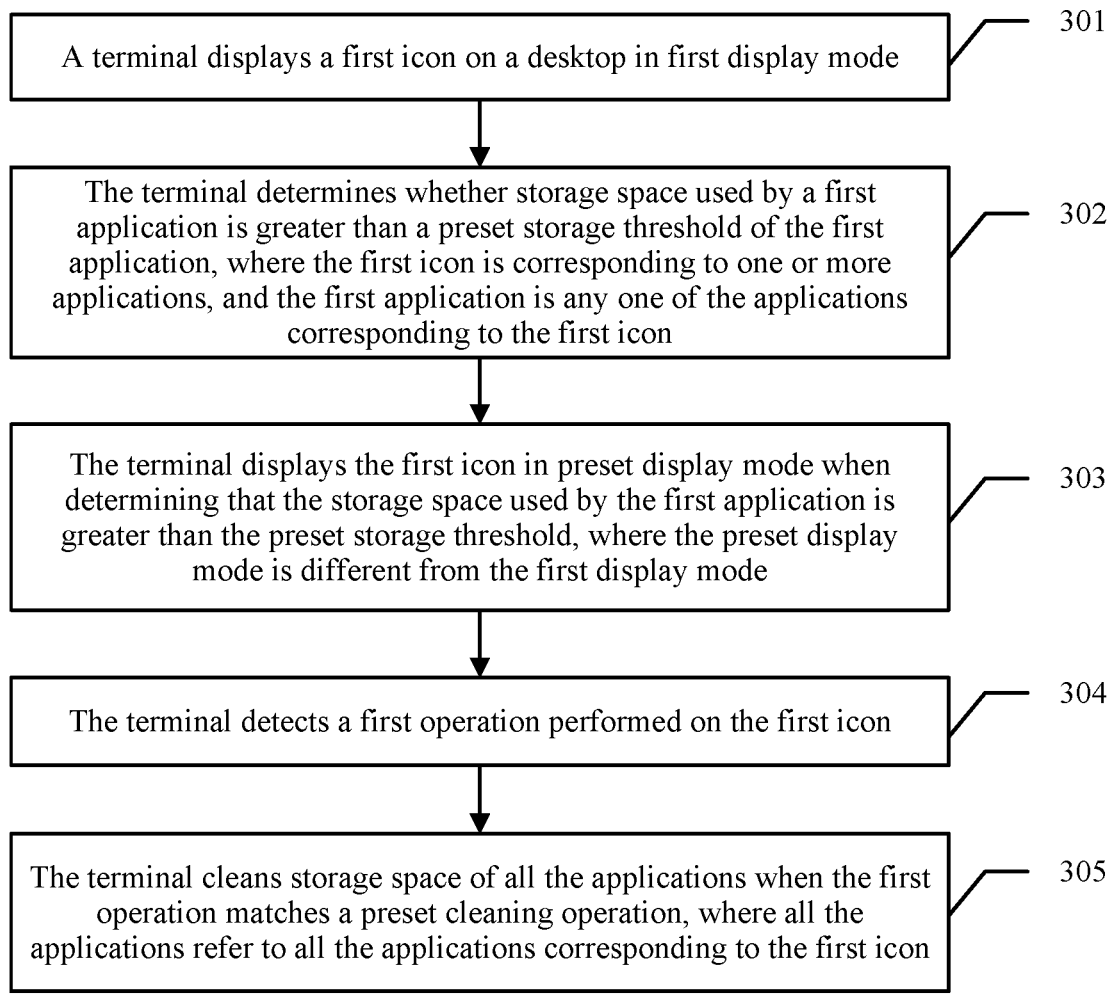
FIG. 3 is another schematic flowchart of a method for displaying application storage space according to an embodiment of the present invention.

Referring to FIG. 3, another embodiment of a method for displaying application storage space in the embodiments of the present invention includes the following steps:

301. A terminal displays a first icon on a desktop in first display mode.

302. The terminal determines whether storage space used by a first application is greater than a preset storage threshold of the first application, where the first icon is corresponding to one or more applications, and the first application is any one of the applications corresponding to the first icon.

303. The terminal displays the first icon in preset display mode when determining that the storage space used by the first application is greater than the preset storage threshold, where the preset display mode is different from the first display mode.

304. The terminal detects a first operation performed on the first icon.

Step 301 to step 304 are similar to step 201 to step 204, and details are not described herein.

305. The terminal cleans storage space of all the applications when the first operation matches a preset cleaning operation, where all the applications refer to all the applications corresponding to the first icon.

In this step, when the first operation performed on the first icon matches the preset cleaning operation, the terminal directly cleans the storage space of all the applications corresponding to the first icon, regardless of whether the first icon is an icon of a single application or a folder icon that includes multiple application icons.

In this embodiment of the present invention, a user can perform an operation on a first icon directly on a desktop to clean storage space of all applications, and no longer needs to search a deep level of an application program interface for a storage space cleaning button, which simplifies a user operation and improves human-computer interaction performance. In addition, the storage space of all the applications corresponding to the first icon is directly cleaned, which further simplifies the user operation and improves the human-computer interaction performance.

In the foregoing embodiments, the terminal displays the first icon in preset display mode that is different from the first display mode. In actual application, there may be many types for both the first display mode and the preset display mode. In addition, because storage space cleaning requires a specific time, the preset cleaning operation needs to be a continuous operation. When cleaning storage space of an application, the terminal may display space release progress in real time by using a progress bar, a progress pie chart (color intensity of a finished part is greater than that of an unfinished part), or the like, and if the continuous operation is interrupted, storage space release is also interrupted at the same time. Alternatively, cleaning progress may be displayed in real time by using different image effects. The following separately details the method for displaying application storage space in the embodiments of the present invention by using two different preset display modes as examples.

Figure 4:
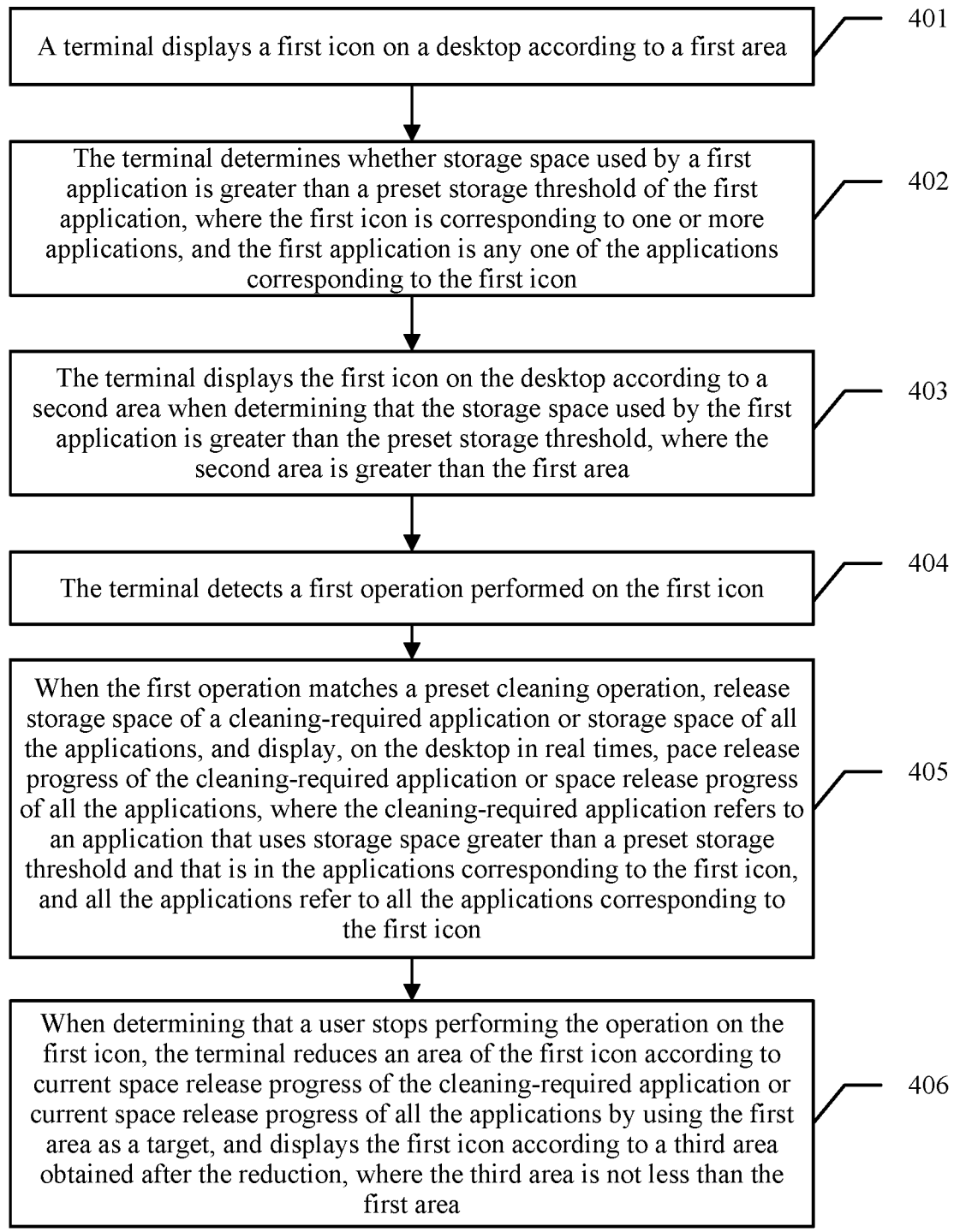
FIG. 4 is another schematic flowchart of a method for displaying application storage space according to an embodiment of the present invention.

Referring to FIG. 4, another embodiment of a method for displaying application storage space in the embodiments of the present invention includes the following steps.

401. A terminal displays a first icon on a desktop according to a first area.

The first area may be an icon display area that is set by default.

402. The terminal determines whether storage space used by a first application is greater than a preset storage threshold of the first application, where the first icon is corresponding to one or more applications, and the first application is any one of the applications corresponding to the first icon.

Step 402 is similar to step 302, and details are not described herein.

403. The terminal displays the first icon on the desktop according to a second area when determining that the storage space used by the first application is greater than the preset storage threshold, where the second area is greater than the first area.

In this step, when determining that the storage space used by the first application is greater than the preset storage threshold, the terminal displays the first icon on the desktop according to the second area that is greater than the first area.

It may be understood that, because of a difference in icon display areas, on the desktop, an icon for which storage space needs to be cleaned can be obviously distinguished from an icon for which storage space does not need to be cleaned temporarily.

A specific value of the second area may be set according to a desktop size and a size of the first area, or may be self-defined by a user, which is not limited herein.

404. The terminal detects a first operation performed on the first icon.

Step 404 is similar to step 304, and details are not described herein.

405. When the first operation matches a preset cleaning operation, release storage space of a cleaning-required application or storage space of all the applications, and display, on the desktop in real time, space release progress of the cleaning-required application or space release progress of all the applications, where the cleaning-required application refers to an application that uses storage space greater than a preset storage threshold and that is in the applications corresponding to the first icon, and all the applications refer to all the applications corresponding to the first icon.

In this step, according to different factory defaults or user-defined settings of the terminal, the terminal may release the storage space of the cleaning-required application or the storage space of all the applications when the first operation matches the preset cleaning operation. It may be understood that, storage space release of an application is a continuous process, and requires a specific time. Correspondingly, in this embodiment, the preset cleaning operation is also a continuous operation, and step 404 and step 405 are simultaneously performed. When the first operation performed by the user on the first icon complies with the preset cleaning operation, the terminal releases the storage space of the cleaning-required application or the storage space of all the applications, and displays, on the desktop in real time, current space release progress of the cleaning-required application or current space release progress of all the applications.

If the first operation performed by the user on the first icon is interrupted, the terminal stops releasing the storage space of the cleaning-required application or the storage space of all the applications. The cleaning-required application refers to the application that uses the storage space greater than the preset storage threshold and that is in the applications corresponding to the first icon, and all the applications refer to all the applications corresponding to the first icon. It may be understood that, during an operation with same setting, the terminal may release only one of the storage space of the cleaning-required application or the storage space of all the applications.

406. When determining that a user stops performing the operation on the first icon, the terminal reduces an area of the first icon according to current space release progress of the cleaning-required application or current space release progress of all the applications by using the first area as a target, and displays the first icon according to a third area obtained after the reduction, where the third area is not less than the first area.

When the user performs the operation on the first icon, the terminal may detect the operation of the user in real time. When determining that the user stops performing the operation on the first icon (for example, when the preset cleaning operation is an operation of touching and holding an icon of an application by the user in an editing state of the desktop to continuously shake the icon, the user stops shaking the first icon, and exits the editing state), the terminal reduces the area of the first icon according to the current space release progress of the cleaning-required application or the current space release progress of all the applications by using the first area as a target, and displays the first icon according to the third area obtained after the reduction, where the third area is not less than the first area.

Specifically, if the first area is X, the second area is Y, and a release ratio in this case is n, the terminal may reduce the area of the icon to $Y-n\times(Y-X)$. For example, the first icon is first displayed on the desktop according to a first area A. When the first application corresponding to the first icon runs for a relatively long time, and the storage space used by the first application is greater than the preset cleaning threshold, the terminal displays the first icon on the desktop according to a second area 1.5 A that is greater than the first area A. The user performs an operation on the first icon to release the storage space of the first application, and stops when 60% of the storage space of the first application is released. The terminal reduces the display area of the first icon to $1.5 A-60\%\times(1.5 A-A)=1.2 A$ (the third area).

In this embodiment of the present invention, a terminal displays a first icon on a desktop according to a first area. When storage space used by a first application corresponding to the first icon is greater than a preset cleaning threshold, the first icon is then displayed according to a second area that is greater than the first area. In this way, a user is clearly reminded, on the desktop and according to a difference in areas, of an application whose storage space needs to be cleaned. In addition, when the user performs, on the desktop, a continuous operation on an icon, where the continuous operation complies with a preset cleaning operation, the terminal may release storage space of an application corresponding to the icon and display space release progress in real time. When the user stops the operation, the terminal may reduce an increased area of the icon by using a ratio that is the same as that for space release, which greatly increases fun of cleaning storage space by the user, and improves human-computer interaction performance of the terminal.

For ease of understanding, the following details a method for cleaning application storage space in this embodiment of the present invention by using a specific application scenario.

There are icons of four applications A, B, C, and D on a desktop of a terminal. It is assumed that storage space used by the four applications and preset cleaning thresholds of the four applications are listed in the following Table 1:

TABLE 1

| Application | Preset cleaning threshold | Used storage space |
| --- | --- | --- |
| A | 50M | 30M |
| B | 80M | 75M |
| C | 20M | 2M |
| D | 200M | 170M |

Figure 5:
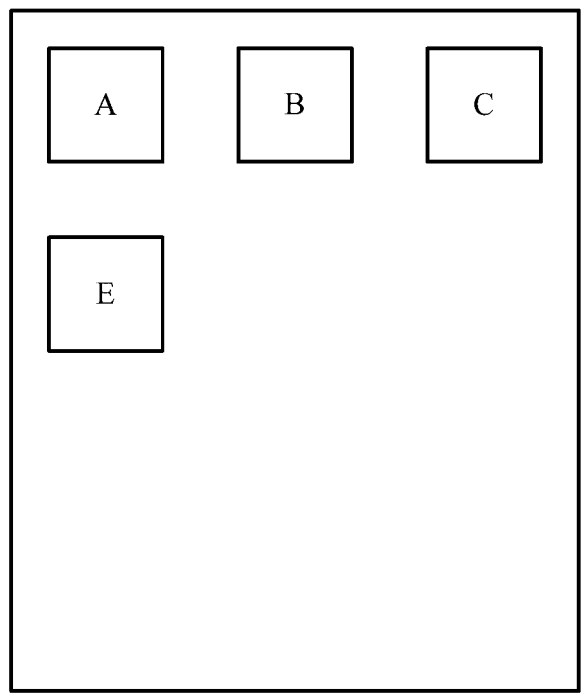
FIG. 5 is a schematic diagram of an instance of a method for displaying application storage space according to an embodiment of the present invention.

As shown in FIG. 5, the terminal displays the icons of the four applications A, B, C, and D on the desktop according to a first area 9.

After the terminal runs for a period of time, the storage space used by the four applications and the preset cleaning thresholds of the four applications change to those listed in the following Table 2:

TABLE 2

| Application | Preset cleaning threshold | Used storage space |
| --- | --- | --- |
| A | 50M | 30M |
| B | 80M | 82M |
| C | 20M | 2M |
| D | 200M | 170M |

During running of the terminal, the terminal may continually (according to a preset time cycle) determine whether storage space used by each application on the desktop is greater than a corresponding preset storage threshold.

Figure 6:
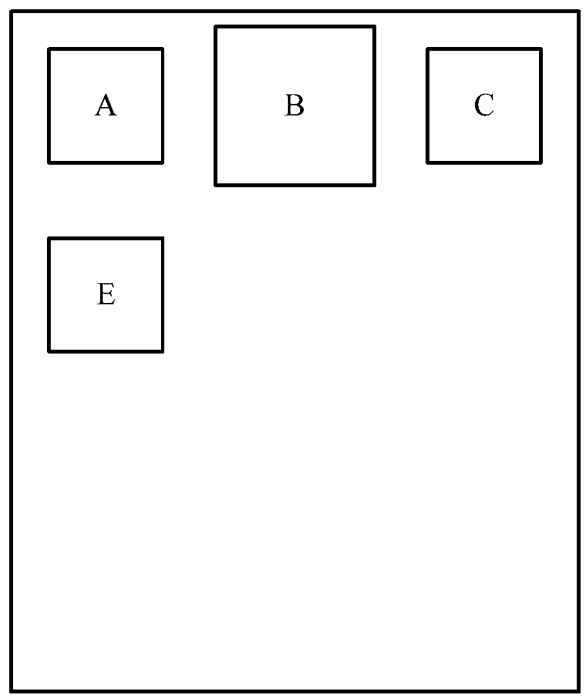
FIG. 6 is a schematic diagram of another instance of a method for displaying application storage space according to an embodiment of the present invention.

As shown in FIG. 6, the terminal determines that the storage space used by the application B is greater than the preset cleaning threshold of the application B. The terminal displays the icon of the application B according to a second area 15, and still displays, according to the first area 9, the icons of the other applications A, C, and D that use storage space not greater than corresponding preset cleaning thresholds.

Figure 7:
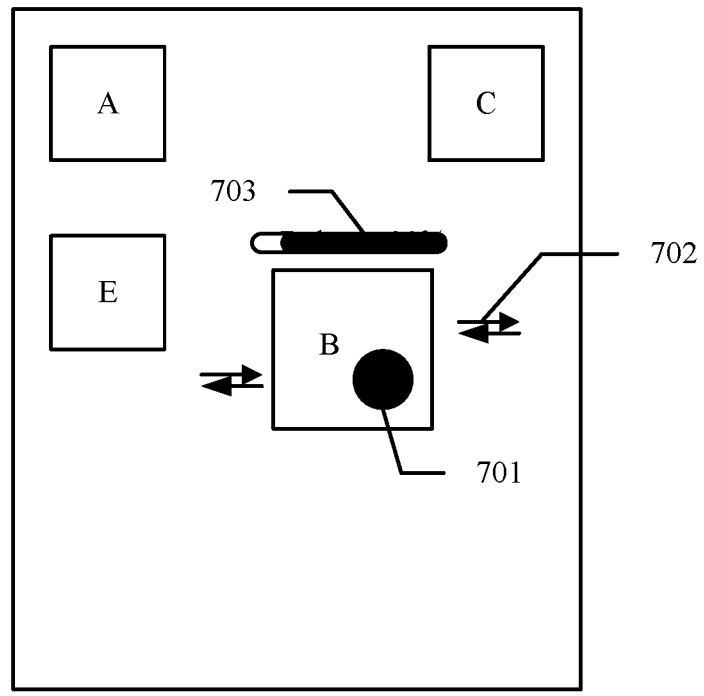
FIG. 7 is a schematic diagram of another instance of a method for displaying application storage space according to an embodiment of the present invention.

In this case, the user touches and holds any icon on the desktop to enter a desktop editing mode, and touches and holds the icon of the application B to continuously shake the icon. A black spot 701 in FIG. 7 represents a touch point of the user on the screen, and arrows 702 represent touching and holding the icon of the application B to continuously shake the icon left and right.

The terminal detects an operation, performed by the user, of continuously shaking the icon of the application B, and determines that the preset cleaning operation is: continuously shaking the icon of the application in an editing state. The terminal determines that the operation performed on the icon of the application B by the user matches the preset cleaning operation, releases the storage space of the application B, and displays, on the desktop in real time, space release progress of the application B by using a progress bar 703 shown in FIG. 7.

Figure 8:
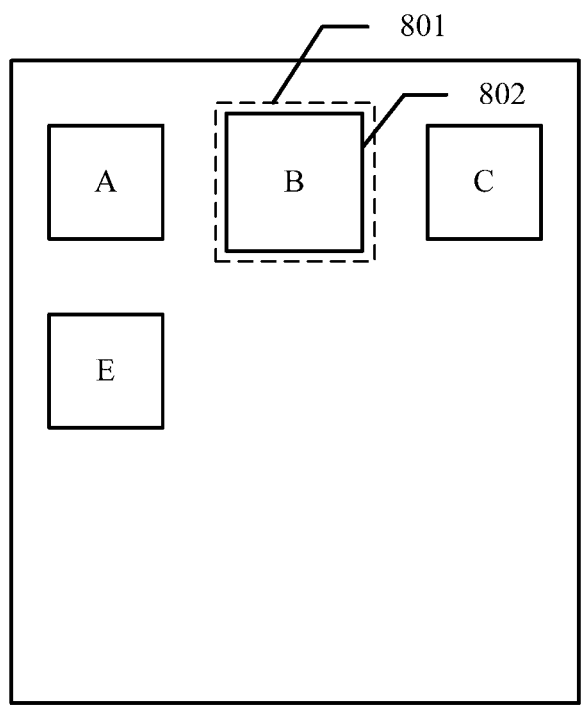
FIG. 8 is a schematic diagram of another instance of a method for displaying application storage space according to an embodiment of the present invention.

If the user stops continuous shaking of the icon of the application B and exits the editing state, and if the space release progress of the application B in this case is 50%, as shown in FIG. 8, the terminal reduces an area of the icon of the application B to $15-50\%\times(15-9)=12.801$ shown in the figure is an area originally occupied by the icon of the application B, and 802 shown in the figure is an area occupied by the icon of the application B after the reduction.

If the user enters the editing mode again to continuously shake the icon of the application B, the terminal releases the storage space of the application B again, and displays, on the desktop in real time, space release progress of the application B.

If the user continuously shakes the icon of the application B until the space release progress, displayed on the desktop, of the application B reaches 100% this time, after the user stops continuous shaking of the icon of the application B and exits the editing state, as shown in FIG. 5, the terminal reduces the area of the icon of the application B to the first area 9, which is the same as each area occupied on the desktop by the icon of the other applications A, C, and D.

Figure 9:
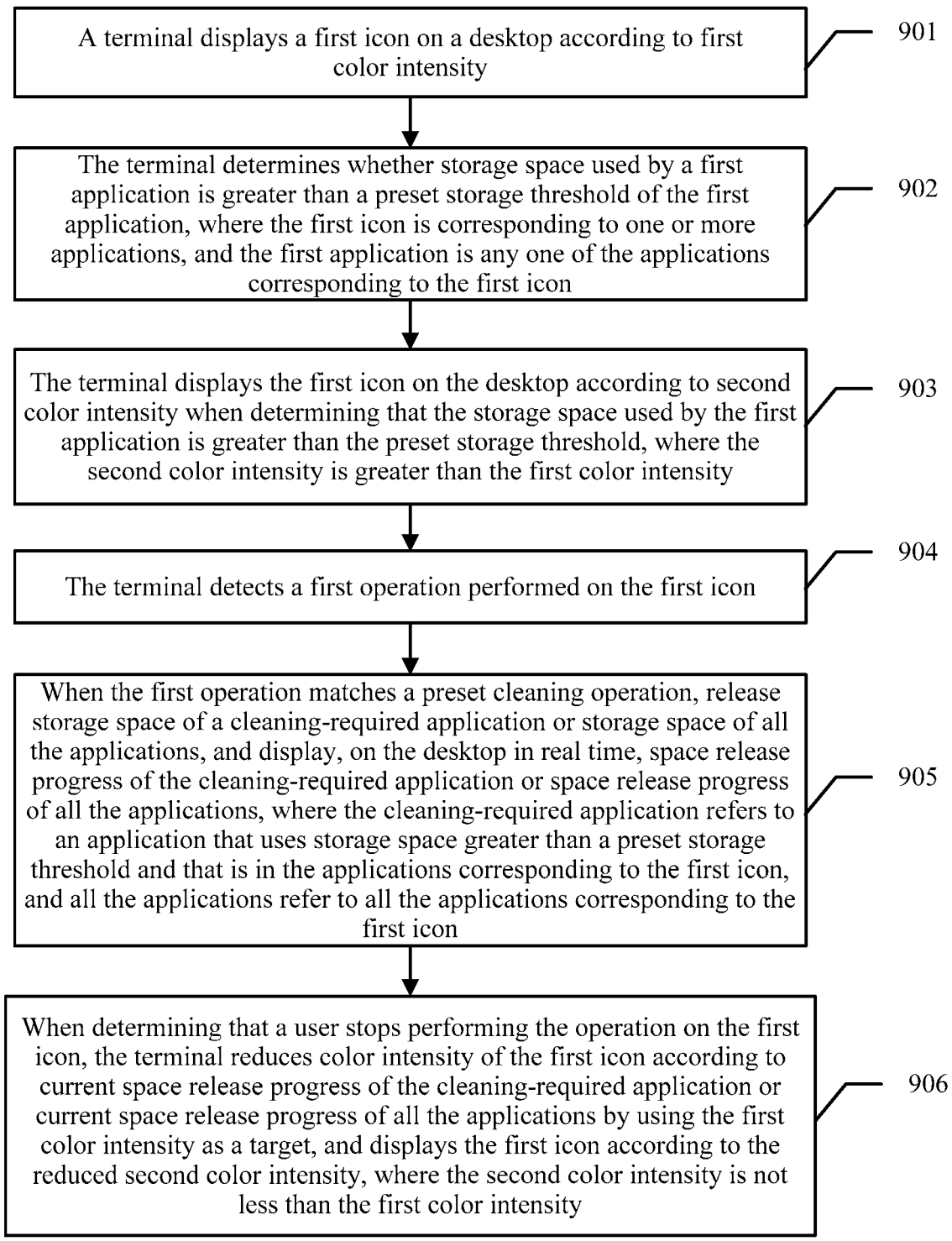
FIG. 9 is another schematic flowchart of a method for displaying application storage space according to an embodiment of the present invention.

In the foregoing embodiment, different areas are used to distinguish icons. The following describes the method for displaying application storage space in the embodiments of the present invention by using another preset display mode as an example. Referring to FIG. 9, another embodiment of a method for displaying application storage space in the embodiments of the present invention includes the following steps.

901. A terminal displays a first icon on a desktop according to first color intensity.

The first color intensity may be icon display color intensity that is set by default.

902. The terminal determines whether storage space used by a first application is greater than a preset storage threshold of the first application, where the first icon is corresponding to one or more applications, and the first application is any one of the applications corresponding to the first icon.

Step 902 is similar to step 402, and details are not described herein.

903. The terminal displays the first icon on the desktop according to second color intensity when determining that the storage space used by the first application is greater than the preset storage threshold, where the second color intensity is greater than the first color intensity.

In this step, when determining that the storage space used by the first application is greater than the preset storage threshold, the terminal displays the first icon on the desktop according to the second color intensity that is greater than the first color intensity.

It may be understood that, because of a difference in icon display color intensity, on the desktop, an icon for which storage space needs to be cleaned can be obviously distinguished from an icon for which storage space does not need to be cleaned temporarily.

A specific value of the second color intensity may be set according to ambient brightness and magnitude of the first color intensity, or may be self-defined by a user, which is not limited herein.

904. The terminal detects a first operation performed on the first icon.

Step 904 is similar to step 404, and details are not described herein.

905. When the first operation matches a preset cleaning operation, release storage space of a cleaning-required application or storage space of all the applications, and display, on the desktop in real time, space release progress of the cleaning-required application or space release progress of all the applications.

Step 905 is similar to step 405, and details are not described herein.

906. When determining that a user stops performing the operation on the first icon, the terminal reduces color intensity of the first icon according to current space release progress of the cleaning-required application or current space release progress of all the applications by using the first color intensity as a target, and displays the first icon according to the reduced second color intensity, where the second color intensity is not less than the first color intensity.

In this embodiment of the present invention, a terminal displays a first icon on a desktop according to first color intensity (normal color intensity). When storage space used by a first application corresponding to the first icon is greater than a preset cleaning threshold, the first icon is then displayed according to second color intensity that is greater than the first color intensity. In this way, a user is clearly reminded, on the desktop, of an application whose storage space needs to be cleaned. In addition, when the user performs, on the desktop, a continuous operation on an icon of an application, where the continuous operation complies with a preset cleaning operation, the terminal may release storage space of the application and display space release progress in real time. When the user stops the operation, the terminal may reduce color intensity of the icon by using a ratio that is the same as that for space release, which greatly increases fun of cleaning storage space by the user, and improves human-computer interaction performance of the terminal.

The foregoing separately describes the method for displaying application storage space in the embodiments of the present invention by using two preset display manners as examples. In actual application, many other manners may alternatively be used to display, in a distinguishing manner, an icon of an application whose storage space needs to be cleaned and an icon of an application whose storage space does not need to be cleaned temporarily, for example, adding a color, adding a filter, or warping an image, which is not limited herein.

Figure 10:
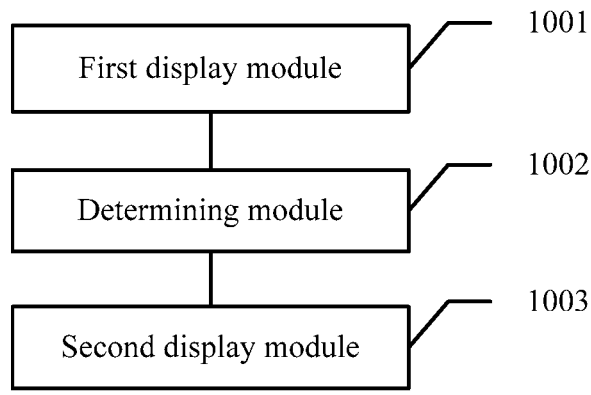
FIG. 10 is a schematic structural diagram of a terminal according to an embodiment of the present invention.

The following describes a terminal in an embodiment of the present invention. Referring to FIG. 10, an embodiment of a terminal in this embodiment of the present invention includes:

a first display module 1001, configured to display a first icon on a desktop in first display mode;

a determining module 1002, configured to determine whether storage space used by a first application is greater than a preset storage threshold of the first application, where the first icon is corresponding to one or more applications, and the first application is any one of the applications corresponding to the first icon; and a second display module 1003, configured to display the first icon in preset display mode when the determining module 1002 determines that the storage space used by the first application is greater than the preset storage threshold, where the preset display mode is different from the first display mode.

In this embodiment of the present invention, a first display module 1001 first displays a first icon on a desktop in first display mode, and when a determining module 1002 determines that storage space used by a first application corresponding to the first icon is greater than a preset storage threshold, a second display module 1003 displays the first icon in preset display mode that is different from the first display mode, so that a display effect of the first icon in this case is different from that achieved when the used storage space is not greater than the preset storage threshold. In this way, when the used storage space is greater than the preset storage threshold, that is, when storage space of the first application corresponding to the first icon needs to be cleaned, the first icon is directly displayed on the desktop in a different display mode. A user can intuitively learn a use state of application storage space according to a difference in display of icons on the desktop, and the user is reminded that storage space of an application needs to be cleaned. Therefore, storage space of an application that uses storage space greater than a preset storage threshold can be cleaned in time, which ensures normal and efficient running of a terminal, and improves human-computer interaction performance of the terminal.

In actual application, after the first display module 1001 displays the first icon in preset display mode, the user may further directly perform an operation on the first icon on the desktop, so as to clean the storage space of the first application. It may be understood that, if the first icon is an icon of a single application, the storage space of the first application may be directly cleaned. If the first icon is a folder icon that includes multiple application icons, the terminal may clean only the storage space of the first application, or may clean storage space of all applications corresponding to the first icon, which is not limited herein. The following describes the terminal in this embodiment of the present invention by using the two cases.

Figure 11:
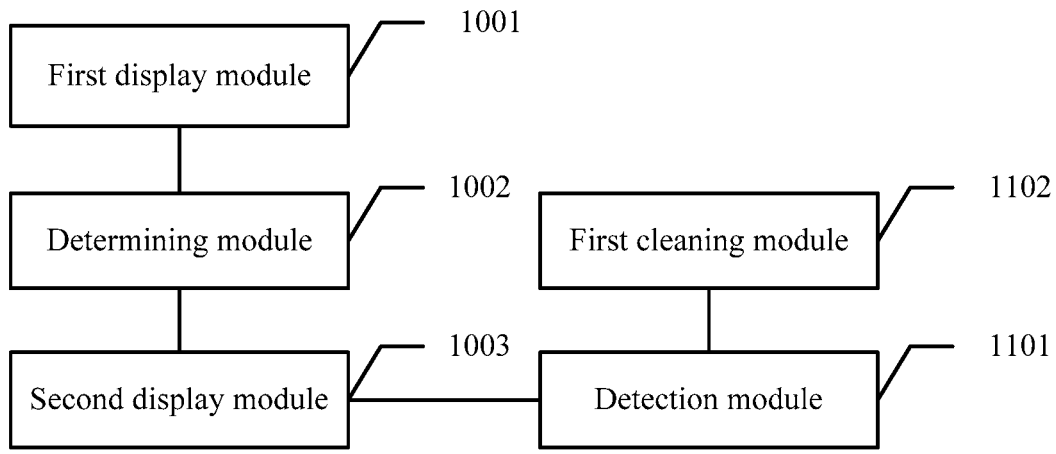
FIG. 11 is another schematic structural diagram of a terminal according to an embodiment of the present invention.

Referring to FIG. 11, in another embodiment of the terminal in this embodiment of the present invention, the terminal shown in FIG. 10 may further include:

a detection module 1101, configured to detect a first operation performed on the first icon; and a first cleaning module 1102, configured to clean storage space of a cleaning-required application when the first operation detected by the detection module 1101 matches a preset cleaning operation, where the cleaning-required application refers to an application that uses storage space greater than a preset storage threshold and that is in the applications corresponding to the first icon.

In this embodiment of the present invention, a user can perform an operation on the first icon directly on a desktop, and a first cleaning module 1102 cleans storage space of the cleaning-required application. The user no longer needs to search a deep level of an application program interface for a storage space cleaning button, which simplifies a user operation and improves human-computer interaction performance. In addition, cleaning is performed on a targeted application that uses storage space greater than a preset storage threshold and that is in applications corresponding to the first icon, which ensures normal and efficient running of a terminal.

Figure 12:
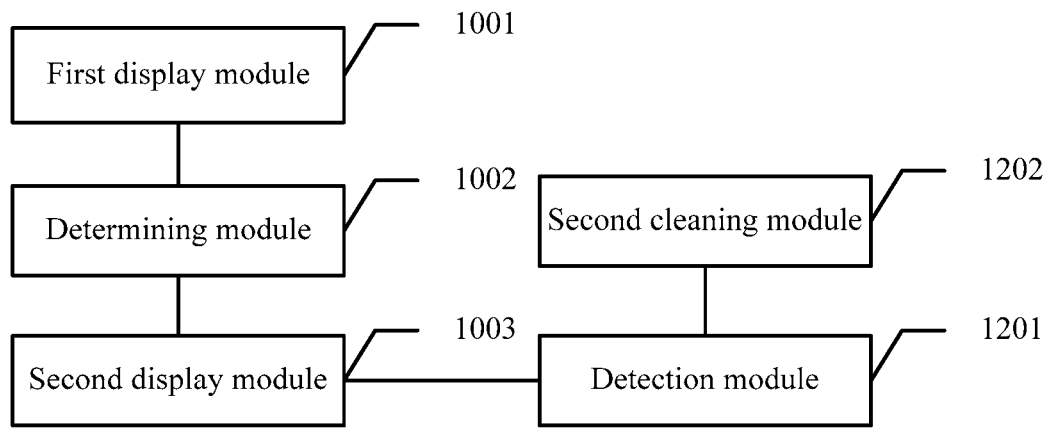
FIG. 12 is another schematic structural diagram of a terminal according to an embodiment of the present invention.

Referring to FIG. 12, in another embodiment of the terminal in this embodiment of the present invention, the terminal shown in FIG. 10 may further include:

a detection module 1201, configured to detect a first operation performed on the first icon; and a second cleaning module 1202, configured to clean storage space of all the applications when the first operation detected by the detection module 1201 matches a preset cleaning operation, where all the applications refer to all the applications corresponding to the first icon.

In this embodiment of the present invention, a user can perform an operation on the first icon directly on a desktop, and a second cleaning module 1202 cleans storage space of all the applications. The user no longer needs to search a deep level of an application program interface for a storage space cleaning button, which simplifies a user operation and improves human-computer interaction performance. In addition, the storage space of all the applications corresponding to the first icon is directly cleaned, which further simplifies the user operation and improves the human-computer interaction performance.

In the foregoing embodiment, a second display module 1003 displays a first icon in preset display mode that is different from a first display mode. In actual application, there may be many types for both the first display mode and the preset display mode. In addition, because storage space cleaning requires a specific time, the preset cleaning operation needs to be a continuous operation. When cleaning storage space of an application, the terminal may display space release progress in real time, and if a continuous operation is interrupted, storage space release is also interrupted at the same time. Alternatively, cleaning progress may be displayed in real time by using different image effects. The following separately details the terminal in this embodiment of the present invention by using two different preset display modes as examples.

Figure 13:
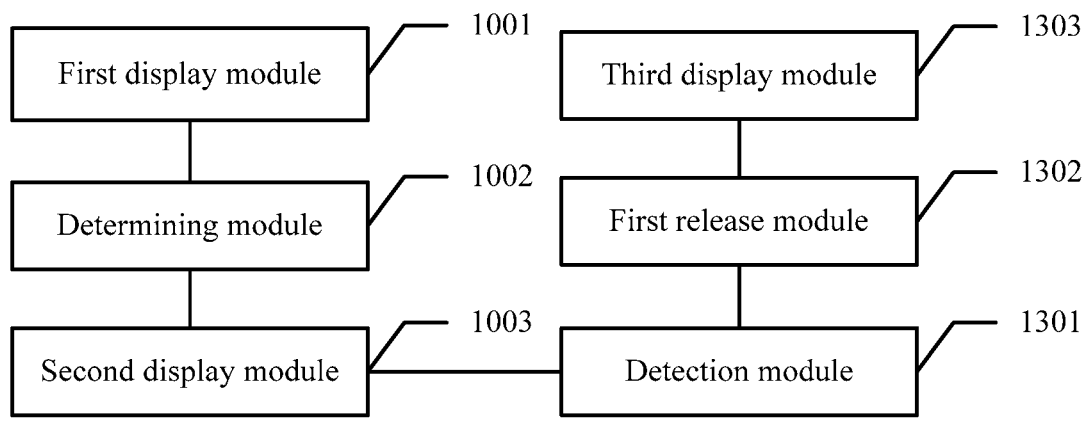
FIG. 13 is another schematic structural diagram of a terminal according to an embodiment of the present invention.

Referring to FIG. 13, in another embodiment of the terminal in this embodiment of the present invention, in the terminal shown in FIG. 10:

the first display module 1001 is specifically configured to display the first icon on the desktop according to a first area; and the second display module 1003 is specifically configured to display the first icon on the desktop according to a second area when the determining module determines that the storage space used by the first application is greater than the preset storage threshold, where the second area is greater than the first area.

Optionally, the terminal may further include:

a detection module 1301, configured to detect a first operation performed on the first icon; and a first release module 1302, configured to: when the first operation detected by the detection module 1301 matches a preset cleaning operation, release storage space of a cleaning-required application or storage space of all the applications, and display, on the desktop in real time, space release progress of the cleaning-required application or space release progress of all the applications, where the cleaning-required application refers to an application that uses storage space greater than a preset storage threshold and that is in the applications corresponding to the first icon, and all the applications refer to all the applications corresponding to the first icon; and a third display module 1303, configured to: when the detection module 1301 determines that a user stops performing the operation on the first icon, reduce an area of the first icon according to current space release progress of the cleaning-required application or current space release progress of all the applications by using the first area as a target, and display the first icon according to a third area obtained after the reduction, where the third area is not less than the first area.

In this embodiment of the present invention, a first display module 1001 displays a first icon on a desktop according to a first area, and when storage space used by a first application corresponding to the first icon is greater than a preset cleaning threshold, a second display module 1003 then displays the first icon according to a second area that is greater than the first area. In this way, a user is clearly reminded, on the desktop and according to a difference in areas, of an application whose storage space needs to be cleaned. In addition, when a detection module 1301 detects that the user performs, on the desktop, a continuous operation on an icon, where the continuous operation complies with a preset cleaning operation, a first release module 1302 may release storage space of an application corresponding to the icon and display space release progress in real time. When the user stops the operation, a third display module 1303 may reduce an increased area of the icon by using a ratio that is the same as that for space release, which greatly increases fun of cleaning storage space by the user, and improves human-computer interaction performance of a terminal.

For ease of understanding the foregoing embodiments, the following describes an interaction process of the modules of the foregoing terminal in a specific application scenario.

There are icons of four applications A, B, C, and D on a desktop of a terminal. It is assumed that storage space used by the four applications and preset cleaning thresholds of the four applications are shown in the foregoing Table 1.

As shown in FIG. 5, the first display module 1001 displays the icons of the four applications A, B, C, and D on the desktop according to a first area 9.

After the terminal runs for a period of time, the storage space used by the four applications and the preset cleaning thresholds of the four applications change to those shown in the foregoing Table 2.

During running of the terminal, the determining module 1002 may continually (according to a preset time cycle) determine whether storage space used by each application on the desktop is greater than a corresponding preset storage threshold.

As shown in FIG. 6, the determining module 1002 determines that the storage space used by the application B is greater than the preset cleaning threshold of the application B. The second display module 1003 displays the icon of the application B according to a second area 15, and the first display module 1001 still displays, according to the first area 9, the other applications A, C, and D that use storage space not greater than corresponding preset cleaning thresholds.

In this case, the user touches and holds any icon on the desktop to enter a desktop editing mode, and touches and holds the icon of the application B to continuously shake the icon. A black spot 701 in FIG. 7 represents a touch point of the user on the screen, and arrows 702 represent touching and holding the icon of the application B to continuously shake the icon left and right.

The detection module 1301 detects an operation, performed by the user, of continuously shaking the icon of the application B, and determines that the preset cleaning operation is: continuously shaking the icon of the application in an editing state. The detection module 1301 determines that the operation performed on the icon of the application B by the user matches the preset cleaning operation. The first release module 1302 releases the storage space of the application B, and displays, on the desktop in real time, space release progress of the application B by using a progress bar 703 in FIG. 7.

If the user stops continuous shaking of the icon of the application B and exits the editing state, and if the space release progress of the application B in this case is 50%, as shown in FIG. 8, the third display module 1303 reduces an area of the icon of the application B to 15−50%×(15−9)=12. 801 shown in the figure is an area originally occupied by the icon of the application B, and 802 shown in the figure is an area occupied by the icon of the application B after the reduction.

If the user enters the editing mode again to continuously shake the icon of the application B, the first release module 1302 releases the storage space of the application B again, and displays, on the desktop in real time, space release progress of the application B.

If the user continuously shakes the icon of the application B until the space release progress, displayed on the desktop, of the application B reaches 100% this time, after the user stops continuous shaking of the icon of the application B and exits the editing state, as shown in FIG. 5, the third display module 1303 reduces the icon of the application B to the first area 9, which is the same as each area occupied on the desktop by the icon of the other applications A, C, and D.

Figure 14:
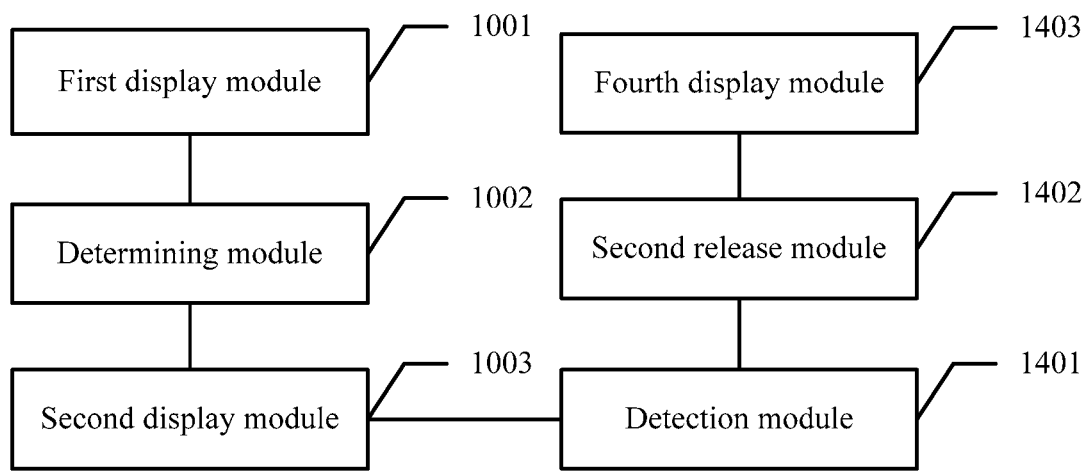
FIG. 14 is another schematic structural diagram of a terminal according to an embodiment of the present invention.

Referring to FIG. 14, in another embodiment of the terminal in this embodiment of the present invention, in the terminal shown in FIG. 10:

the first display module 1001 is specifically configured to display the first icon on the desktop according to first color intensity; and the second display module 1003 is specifically configured to display the first icon on the desktop according to second color intensity when the determining module determines that the storage space used by the first application is greater than the preset storage threshold, where the second color intensity is greater than the first color intensity.

Optionally, the terminal may further include:

a detection module 1401, configured to detect a first operation performed on the first icon;

a second release module 1402, configured to: when the first operation detected by the detection module 1401 matches a preset cleaning operation, release storage space of a cleaning-required application or storage space of all the applications, and display, on the desktop in real time, space release progress of the cleaning-required application or space release progress of all the applications, where the cleaning-required application refers to an application that uses storage space greater than a preset storage threshold and that is in the applications corresponding to the first icon, and all the applications refer to all the applications corresponding to the first icon; and a fourth display module 1403, configured to: when the detection module 1401 determines that a user stops performing the operation on the first icon, reduce color intensity of the first icon according to current space release progress of the cleaning-required application or current space release progress of all the applications by using the first color intensity as a target, and display the first icon according to the reduced second color intensity, where the second color intensity is not less than the first color intensity.

In this embodiment of the present invention, a first display module 1001 displays a first icon on a desktop according to first color intensity (normal color intensity), and when storage space used by a first application corresponding to the first icon is greater than a preset cleaning threshold, a second display module 1003 then displays the first icon according to second color intensity that is greater than the first color intensity. In this way, a user is clearly reminded, on the desktop, of an application whose storage space needs to be cleaned. In addition, when the user performs, on the desktop, a continuous operation on an icon of an application, where the continuous operation complies with a preset cleaning operation, a second release module 1402 may release storage space of the application and display space release progress in real time. When the user stops the operation, a fourth display module 1403 may reduce color intensity of the icon by using a ratio that is the same as that for space release, which greatly increases fun of cleaning storage space by the user, and improves human-computer interaction performance of a terminal.

Figure 15:
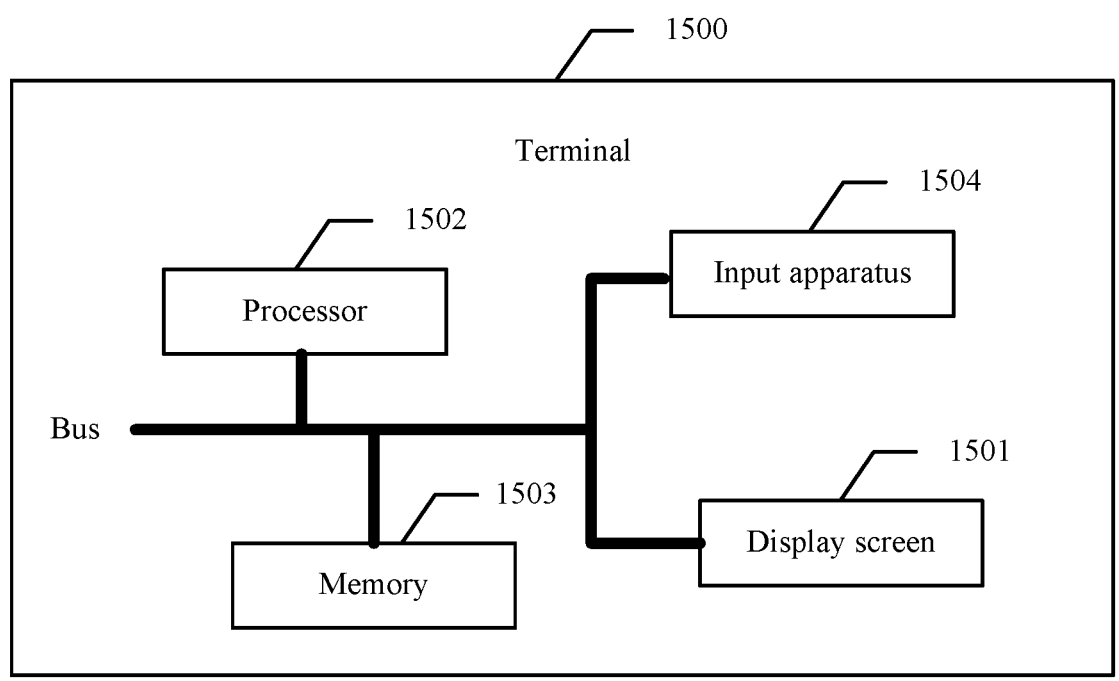
FIG. 15 is another schematic structural diagram of a terminal according to an embodiment of the present invention.

Referring to FIG. 15, another embodiment of a terminal in the embodiments of the present invention includes:

a display screen 1501, a processor 1502, a memory 1503, and an input apparatus 1504.

In some embodiments of the present invention, the display screen 1501, the processor 1502, the input apparatus 1504, and the memory 1503 may be connected by using a bus or in another manner, and connection using a bus is used as an example in FIG. 15.

The display screen 1501 is used as an output interface between the terminal and a user, and displays visual output for the user.

The input apparatus 1504 is configured to receive an operation of the user.

The processor 1502 is configured to perform the following steps by invoking an operation instruction stored in the memory 1503:

instructing the display screen 1501 to display a first icon on a desktop in first display mode;

determining whether storage space used by a first application is greater than a preset storage threshold of the first application, where the first icon is corresponding to one or more applications, and the first application is any one of the applications corresponding to the first icon; and when determining that the storage space used by the first application is greater than the preset storage threshold, instructing the display screen 1501 to display the first icon in preset display mode, where the preset display mode is different from the first display mode.

In some embodiments of the present invention, when performing the step of instructing the display screen 1501 to display a first icon on a desktop in first display mode, the processor 1502 specifically performs the following step:

instructing the display screen 1501 to display the first icon on the desktop according to a first area; and when performing the step of instructing the display screen 1501 to display the first icon in preset display mode, the processor 1502 specifically performs the following step:

instructing the display screen 1501 to display the first icon on the desktop according to a second area, where the second area is greater than the first area.

In some embodiments of the present invention, when performing the step of instructing the display screen 1501 to display a first icon on a desktop in first display mode, the processor 1502 specifically performs the following step:

instructing the display screen 1501 to display the first icon on the desktop according to first color intensity; and when performing the step of instructing the display screen 1501 to display the first icon in preset display mode, the processor 1502 specifically performs the following step:

instructing the display screen 1501 to display the first icon on the desktop according to second color intensity, where the second color intensity is greater than the first color intensity.

In some embodiments of the present invention, the processor 1502 is further configured to perform the following steps:

detecting a first operation that is performed by the user on the first icon and received by the input apparatus 1504; and cleaning storage space of a cleaning-required application or storage space of all the applications when the detected first operation matches a preset cleaning operation, where the cleaning-required application refers to an application that uses storage space greater than a preset storage threshold and that is in the applications corresponding to the first icon, and all the applications refer to all the applications corresponding to the first icon.

In some embodiments of the present invention, the processor 1502 is further configured to perform the following steps:

detecting a first operation that is performed by the user on the first icon and received by the input apparatus 1504;

when the detected first operation matches a preset cleaning operation, releasing storage space of a cleaning-required application or storage space of all the applications, and instructing the display screen 1501 to display, on the desktop in real time, space release progress of the cleaning-required application or space release progress of all the applications, where the cleaning-required application refers to an application that uses storage space greater than a preset storage threshold and that is in the applications corresponding to the first icon, and all the applications refer to all the applications corresponding to the first icon; and when determining that the user stops performing the operation on the first icon, reducing an area of the first icon according to current space release progress of the cleaning-required application or current space release progress of all the applications by using the first area as a target, and instructing the display screen 1501 to display the first icon according to a third area obtained after the reduction, where the third area is not less than the first area.

In some embodiments of the present invention, the processor 1502 is further configured to perform the following steps:

detecting a first operation that is performed by the user on the first icon and received by the input apparatus 1504;

when the detected first operation matches a preset cleaning operation, releasing storage space of a cleaning-required application or storage space of all the applications, and instructing the display screen 1501 to display, on the desktop in real time, space release progress of the cleaning-required application or space release progress of all the applications, where the cleaning-required application refers to an application that uses storage space greater than a preset storage threshold and that is in the applications corresponding to the first icon, and all the applications refer to all the applications corresponding to the first icon; and when determining that the user stops performing the operation on the first icon, reducing color intensity of the first icon according to current space release progress of the cleaning-required application or current space release progress of all the applications by using the first color intensity as a target, and instructing the display screen to display the first icon according to the reduced second color intensity, where the second color intensity is not less than the first color intensity.

In some embodiments of the present invention, the preset cleaning operation is an operation of touching and holding an icon by a user in an editing state of the desktop to continuously shake the icon.

Figure 16:
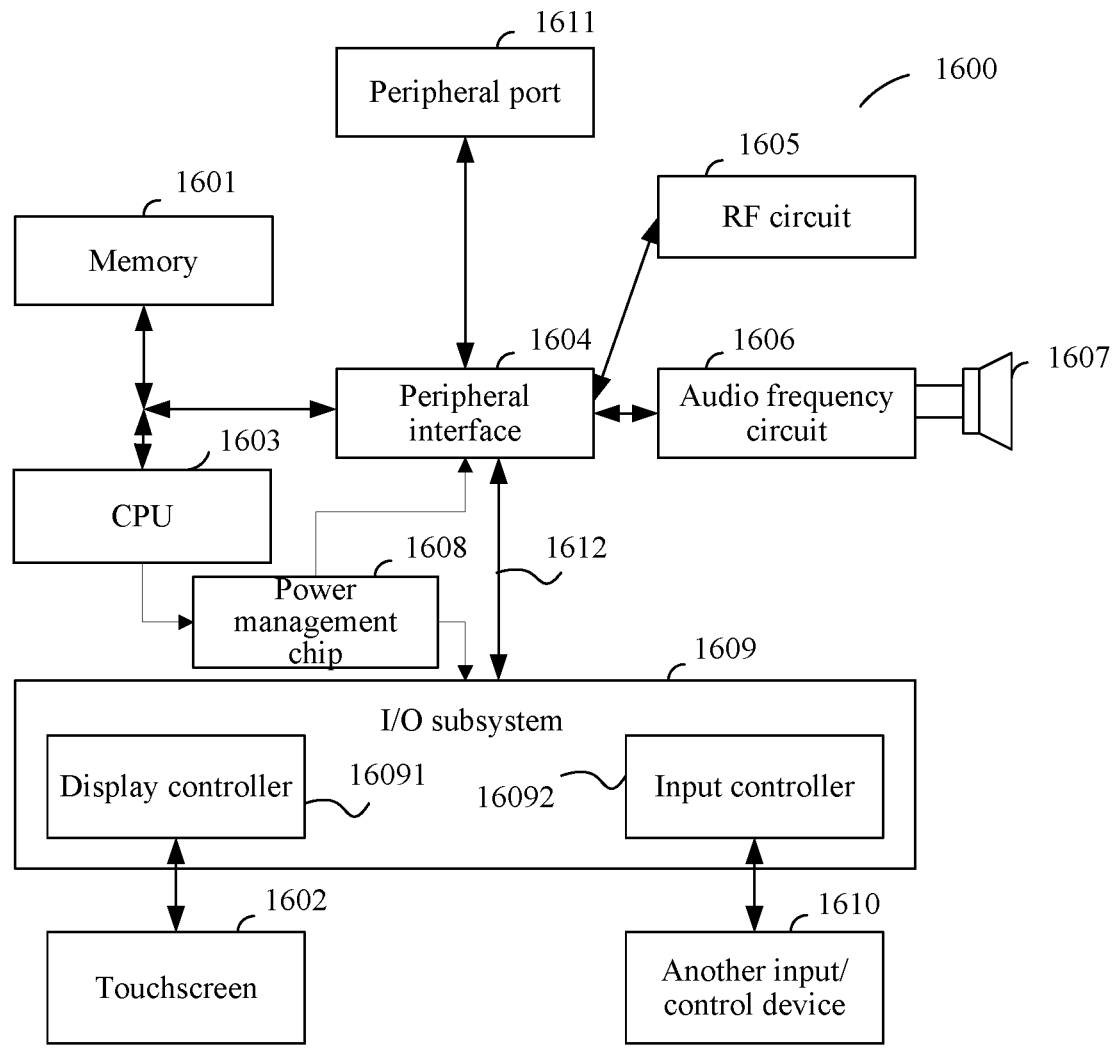
FIG. 16 is another schematic structural diagram of a terminal according to an embodiment of the present invention.

It may be understood that, in actual application, the foregoing terminal may be a touchscreen mobile phone. In this case, the foregoing input apparatus may be a touch-sensitive surface of the display screen. Referring to FIG. 16, the following details the terminal in the present invention by using a touchscreen mobile phone as an example.

It should be understood that, a mobile phone 1600 shown in the figure is merely an example of the terminal. The mobile phone 1600 may have components more or fewer than those shown in the figure, may have two or more components combined, or may have different component configurations. Various components shown in the figure may be implemented by hardware that includes one or more signal processing and/or application-specific integrated circuits, by software, or in a combination of hardware and software.

Herein, a mobile phone is used as an example for specific description. FIG. 16 is a schematic structural diagram of a mobile phone used to display application storage space according to the present invention. As shown in FIG. 16, the mobile phone includes a memory 1601, a touchscreen 1602, a central processing unit (Central Processing Unit, CPU for short) 1603, a peripheral interface 1604, an RF circuit 1605, an audio frequency circuit 1606, a loudspeaker 1607, a power management chip 1608, an input/output (I/O) subsystem 1609, another input/control device 1610, and an external port 1604. These components communicate with each other by using one or more communications buses or signal cables 1612.

It should be noted that, the mobile phone provided in this embodiment is merely an example of the terminal. The terminal involved in this embodiment of the present invention may have components more or fewer than those shown in FIG. 16, may have two or more components combined, or may have different component configurations or settings. Various components may be implemented by hardware that includes one or more signal processing and/or application-specific integrated circuits, by software, or in a combination of hardware and software.

The following details the mobile phone provided in this embodiment for displaying application storage space.

Memory 1601: The memory 1601 may be accessed by the CPU 1603, the peripheral interface 1604, and the like. The memory 1601 may include a high-speed random access memory, or may include a non-volatile memory, for example, one or more magnetic disk storage devices, a flash device, or another volatile solid-state storage device.

Peripheral interface 1604: The peripheral interface may connect input and output peripherals of the device to the CPU 1603 and the memory 1601.

I/O subsystem 1609: The I/O subsystem 1609 may connect the input and output peripherals of the device, such as the touchscreen 1602 and the another input/control device 1610, to the peripheral interface 1604. The I/O subsystem 1609 may include a display controller 16091 and one or more input controllers 16092 configured to control the another input/control device 1610. The one or more input controllers 16092 receive an electrical signal from the another input/control device 1610 or send an electrical signal to the another input/control device 210, and the another input/control device 1610 may include a physical button (such as a press button or a rocker button), a dial pad, a slider switch, a joystick, and a click scroll wheel. It should be noted that the input controller 16092 may be connected to any one of the following: a keyboard, an infrared port, a USB interface, or a pointing device such as a mouse.

Touchscreen 1602: The touchscreen 1602 is both an input interface and an output interface between the mobile terminal and a user, and displays visual output to the user, where the visual output may include graphics, a text, an icon, a video, and the like.

The display controller 16091 in the I/O subsystem 1609 receives an electrical signal from the touchscreen 1602 or sends an electrical signal to the touchscreen 1602. The touchscreen 1602 detects a touch on the touchscreen, and the display controller 16091 converts the detected touch into interaction between a user and a user interface object displayed on the touchscreen 1602, that is, implementing human-machine interaction. The user interface object displayed on the touchscreen 1602 may be an icon for running a game, an icon for accessing a corresponding network, or the like. It should be noted that the device may further include an optical mouse, where the optical mouse is a touch-sensitive surface that does not display visual output, or an extension part of a touch-sensitive surface formed by the touchscreen.

The RF circuit 1605 is mainly configured to establish communication between the mobile phone and a wireless network (that is, a network side), so as to implement data receiving and sending between the mobile phone and the wireless network, for example, SMS message or email receiving and sending. Specifically, the RF circuit 1605 receives and sends an RF signal, where the RF signal is also referred to as an electromagnetic signal. The RF circuit 1605 converts an electrical signal into an electromagnetic signal or converts an electromagnetic signal into an electrical signal, and communicates with a communications network and another device by using the electromagnetic signal. The RF circuit 1605 may include a known circuit configured to perform these functions, and includes but is not limited to an antenna system, an RF transceiver, one or more amplifiers, a tuner, one or more oscillators, a digital signal processor, a CODEC chip set, a subscriber identity module (Subscriber Identity Module, SIM), or the like.

The audio frequency circuit 1606 is mainly configured to: receive audio data from the peripheral interface 1604, convert the audio data into an electrical signal, and send the electrical signal to the loudspeaker 1607.

The loudspeaker 1607 is configured to: restore, to a sound, an audio signal that is received by the mobile phone from the wireless network by using the RF circuit 1605, and play the sound for a user.

The power management integrated circuit 1608 is configured to supply power to and perform power management on hardware that is connected to the CPU 1603, the I/O subsystem, and the peripheral interface.

In this embodiment of the present invention, the processor 1603 is configured to perform the following steps by invoking an operation instruction stored in the memory 1601:

instructing the touchscreen 1602 to display a first icon on a desktop in first display mode;

determining whether storage space used by a first application is greater than a preset storage threshold of the first application, where the first icon is corresponding to one or more applications, and the first application is any one of the applications corresponding to the first icon; and when determining that the storage space used by the first application is greater than the preset storage threshold, instructing the touchscreen 1602 to display the first icon in preset display mode, where the preset display mode is different from the first display mode.

In some embodiments of the present invention, when performing the step of instructing the touchscreen 1602 to display a first icon on a desktop in first display mode, the processor 1603 specifically performs the following step:

instructing the touchscreen 1602 to display the first icon on the desktop according to a first area; and when performing the step of instructing the touchscreen 1602 to display the first icon in preset display mode, the processor specifically performs the following step:

instructing the touchscreen to display the first icon on the desktop according to a second area, where the second area is greater than the first area.

In some embodiments of the present invention, when performing the step of instructing the touchscreen 1602 to display a first icon on a desktop in first display mode, the processor 1603 specifically performs the following step:

instructing the touchscreen 1602 to display the first icon on the desktop according to first color intensity; and when performing the step of instructing the touchscreen 1602 to display the first icon in preset display mode, the processor specifically performs the following step:

instructing the touchscreen 1602 to display the first icon on the desktop according to second color intensity, where the second color intensity is greater than the first color intensity.

In some embodiments of the present invention, the processor 1603 is further configured to perform the following steps:

detecting a first operation that is performed by a user on the first icon and received by the touchscreen 1602; and cleaning storage space of a cleaning-required application when the detected first operation matches a preset cleaning operation, where the cleaning-required application refers to an application that uses storage space greater than a preset storage threshold and that is in the applications corresponding to the first icon.

In some embodiments of the present invention, the processor 1603 is further configured to perform the following steps:

detecting a first operation that is performed by a user on the first icon and received by the touchscreen 1602; and cleaning storage space of all the applications when the detected first operation matches a preset cleaning operation, where all the applications refer to all the applications corresponding to the first icon.

In some embodiments of the present invention, the processor 1603 is further configured to perform the following steps:

detecting a first operation that is performed by a user on the first icon and received by the touchscreen 1602;

when the detected first operation matches a preset cleaning operation, releasing storage space of a cleaning-required application or storage space of all the applications, and instructing the touchscreen 1602 to display, on the desktop in real time, space release progress of the cleaning-required application or space release progress of all the applications, where the cleaning-required application refers to an application that uses storage space greater than a preset storage threshold and that is in the applications corresponding to the first icon, and all the applications refer to all the applications corresponding to the first icon; and when determining that the user stops performing the operation on the first icon, reducing an area of the first icon according to current space release progress of the cleaning-required application or current space release progress of all the applications by using the first area as a target, and instructing the touchscreen 1602 to display the first icon according to a third area obtained after the reduction, where the third area is not less than the first area.

In some embodiments of the present invention, the processor 1603 is further configured to perform the following steps:

detecting a first operation that is performed by a user on the first icon and received by the touchscreen 1602;

when the detected first operation matches a preset cleaning operation, releasing storage space of a cleaning-required application or storage space of all the applications, and instructing the touchscreen 1602 to display, on the desktop in real time, space release progress of the cleaning-required application or space release progress of all the applications, where the cleaning-required application refers to an application that uses storage space greater than a preset storage threshold and that is in the applications corresponding to the first icon, and all the applications refer to all the applications corresponding to the first icon; and when determining that the user stops performing the operation on the first icon, reducing, by the terminal, color intensity of the first icon according to current space release progress of the cleaning-required application or current space release progress of all the applications by using the first color intensity as a target, and instructing the touchscreen 1602 to display the first icon according to the reduced second color intensity, where the second color intensity is not less than the first color intensity.

An embodiment of the present invention further provides a graphical user interface on a terminal device. The terminal device includes a display screen, a memory, multiple application programs, and one or more processors configured to execute one or more programs stored in the memory, and the graphical user interface includes:

an interface used to display an application interface element, where:

the interface used to display the application interface element includes:

displaying a first icon on the display screen in first display mode, where the first icon is corresponding to one or more application programs; and displaying the first icon in preset display mode in response to detecting that storage space used by a first application is greater than a preset storage threshold, where the first application is any one of the application programs corresponding to the first icon, and the preset display mode is different from the first display mode.

In some embodiments of the present invention, the displaying a first icon on the display screen in first display mode specifically includes:

displaying the first icon on a desktop of the terminal device according to a first area; and the displaying the first icon in preset display mode specifically includes:

displaying the first icon on the desktop according to a second area, where the second area is greater than the first area.

In some embodiments of the present invention, the displaying a first icon on the display screen in first display mode specifically includes:

displaying the first icon on a desktop of the terminal device according to first color intensity; and the displaying the first icon in preset display mode specifically includes:

displaying the first icon on the desktop according to second color intensity, where the second color intensity is greater than the first color intensity.

In some embodiments of the present invention, after the step of displaying the first icon on the desktop according to a second area, the interface used to display the application interface element further includes:

displaying, on the desktop in real time, space release progress of a cleaning-required application or space release progress of all the applications in response to detecting that a first operation performed on the first icon matches a preset cleaning operation, where the cleaning-required application refers to an application that uses storage space greater than a preset storage threshold and that is in the applications corresponding to the first icon, and all the applications refer to all the applications corresponding to the first icon; and in response to detecting that the first operation is stopped, reducing an area of the first icon according to current space release progress of the cleaning-required application or current space release progress of all the applications by using the first area as a target, and displaying the first icon according to a third area obtained after the reduction, where the third area is not less than the first area.

In some embodiments of the present invention, after the step of displaying the first icon on the desktop according to second color intensity, the interface used to display the application interface element further includes:

displaying, on the desktop in real time, space release progress of a cleaning-required application or space release progress of all the applications in response to detecting that a first operation performed on the first icon matches a preset cleaning operation, where the cleaning-required application refers to an application that uses storage space greater than a preset storage threshold and that is in the applications corresponding to the first icon, and all the applications refer to all the applications corresponding to the first icon; and in response to detecting that the first operation is stopped, reducing color intensity of the first icon according to current space release progress of the cleaning-required application or current space release progress of all the applications by using the first color intensity as a target, and displaying the first icon according to the reduced second color intensity, where the second color intensity is not less than the first color intensity.

In an embodiment of the present invention, a computer-readable storage medium that stores one or more programs is further included, and the one or more programs include an instruction. When an electronic device that includes a display and multiple application programs executes the instruction, the electronic device is enabled to perform the method according to claims 1 to 7, and the display includes a display screen.

In an embodiment of the present invention, an information processing apparatus used in an electronic device that includes a display and multiple application programs is further included, and the information processing apparatus is, for example, a component, a module, or an apparatus that can be independently manufactured and sold. The display includes a display screen, and the information processing apparatus includes:

an apparatus configured to display a first icon on the display screen in first display mode;

an apparatus configured to determine whether storage space used by a first application is greater than a preset storage threshold of the first application, where the first icon is corresponding to one or more applications, and the first application is any one of the applications corresponding to the first icon; and an apparatus configured to display the first icon in preset display mode when it is determined that the storage space used by the first application is greater than the preset storage threshold, where the preset display mode is different from the first display mode.

In some embodiments of the present invention, the apparatus configured to display a first icon on the display screen in first display mode is specifically:

an apparatus configured to display the first icon on a desktop display interface of the display screen according to a first area; and the apparatus configured to display the first icon in preset display mode is specifically:

an apparatus configured to display the first icon on the desktop according to a second area, where the second area is greater than the first area.

In some embodiments of the present invention, the apparatus configured to display a first icon on the display screen in first display mode is specifically:

an apparatus configured to display the first icon on a desktop display interface of the display screen according to first color intensity; and the apparatus configured to display the first icon in preset display mode is specifically:

an apparatus configured to display the first icon on the desktop according to second color intensity, where the second color intensity is greater than the first color intensity.

In some embodiments of the present invention, the information processing apparatus further includes:

an apparatus configured to detect a first operation performed on the first icon; and an apparatus configured to clean storage space of a cleaning-required application or storage space of all the applications when the first operation matches a preset cleaning operation, where the cleaning-required application refers to an application that uses storage space greater than a preset storage threshold and that is in the applications corresponding to the first icon, and all the applications refer to all the applications corresponding to the first icon.

In some embodiments of the present invention, the information processing apparatus further includes:

an apparatus configured to detect a first operation performed on the first icon;

an apparatus configured to: when the first operation matches a preset cleaning operation, release storage space of a cleaning-required application or storage space of all the applications, and display, on the desktop in real time, space release progress of the cleaning-required application or space release progress of all the applications, where the cleaning-required application refers to an application that uses storage space greater than a preset storage threshold and that is in the applications corresponding to the first icon, and all the applications refer to all the applications corresponding to the first icon; and an apparatus configured to: when it is determined that a user stops performing the operation on the first icon, reduce an area of the first icon according to current space release progress of the cleaning-required application or current space release progress of all the applications by using the first area as a target, and display the first icon according to a third area obtained after the reduction, where the third area is not less than the first area.

In some embodiments of the present invention, the information processing apparatus further includes:

an apparatus configured to detect a first operation performed on the first icon;

an apparatus configured to: when the first operation matches a preset cleaning operation, release storage space of a cleaning-required application or storage space of all the applications, and display, on the desktop in real time, space release progress of the cleaning-required application or space release progress of all the applications, where the cleaning-required application refers to an application that uses storage space greater than a preset storage threshold and that is in the applications corresponding to the first icon, and all the applications refer to all the applications corresponding to the first icon; and an apparatus configured to: when it is determined that a user stops performing the operation on the first icon, reduce color intensity of the first icon according to current space release progress of the cleaning-required application or current space release progress of all the applications by using the first color intensity as a target, and display the first icon according to the reduced second color intensity, where the second color intensity is not less than the first color intensity.

In an embodiment of the present invention, a graphical user interface on an electronic device is further included. The electronic device includes a display, a memory, multiple application programs, and one or more processors configured to execute one or more programs stored in the memory, the graphical user interface includes a user interface displayed by using the method according to any one of claims 1 to 7, and the display includes a display screen.

In an embodiment of the present invention, an electronic device is further included, including:

a display, where the display includes a display screen;

one or more processors;

a memory;

multiple application programs; and one or more programs, where the one or more programs are stored in the memory and configured to be executed by the one or more processors, and the one or more programs include an instruction used to perform the methods for displaying application storage space in the embodiments corresponding to FIG. 1 to FIG. 4.

In an embodiment of the present invention, an information processing apparatus used in an electronic device is further included. The electronic device includes a display and multiple application programs, and the information processing apparatus includes:

an apparatus configured to perform the methods for displaying application storage space in the embodiments corresponding to FIG. 1 to FIG. 4, where the display includes a display screen.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and parts displayed as units may or may not be physical units, may be located in one position, or may be distributed on multiple network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The computer software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended to describe the technical solutions of the present invention, but not to limit the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method for displaying application storage space, the method comprising:
    displaying, by a terminal, an icon on a desktop in first display mode, wherein the icon corresponds to multiple applications;
    determining, by the terminal, whether storage space used by one or more of the multiple applications is greater than a corresponding preset storage threshold value for each of the multiple applications;
    displaying, by the terminal, the icon on the desktop in a preset display mode in response to determining that the storage space used by one or more of the multiple applications is greater than the corresponding preset storage threshold value for each of the one or more of the multiple applications, wherein the preset display mode is different from the first display mode;
    detecting, by the terminal, an operation performed by a user on the icon displayed on the desktop in the preset display mode;
    releasing, by the terminal, storage space of a cleaning-required application;
    cleaning, by the terminal, the storage space used by the one or more of the multiple applications when the operation matches a preset cleaning operation, wherein the preset cleaning operation is an operation of selecting and continuously shaking the icon by the user in an editing state of the desktop, and wherein an area occupied by the icon reduces in real time during the shaking until the preset cleaning operation is completed; and
    displaying, by the terminal and in real time, space release progress of the cleaning-required application or space release progress of all applications;
    wherein the cleaning-required application is an application that uses an amount of storage space greater than a preset threshold amount of storage space for the cleaning-required application.

2. The method according to claim 1, wherein:
    the displaying the icon on the desktop in the first display mode comprises:
    displaying, by the terminal, the icon on the desktop according to a first area; and
    displaying the icon in the preset display mode comprises displaying, by the terminal, the icon on the desktop according to a second area, wherein the second area is greater than the first area.

3. The method according to claim 2, wherein after the cleaning the storage space, the method further comprises:
    when determining that the user stops performing the operation on the icon, reducing, by the terminal, an area of the icon according to current space release progress of the storage space, and displaying the icon according to a third area obtained after the reducing, wherein the third area is not less than the first area.

4. The method according to claim 1, wherein
    the displaying the icon on the desktop in the first display mode comprises
    displaying, by the terminal, the icon on the desktop according to a first color intensity; and
    displaying the icon in a preset display mode comprises displaying, by the terminal, the icon on the desktop according to a second color intensity, wherein the second color intensity is greater than the first color intensity.

5. The method according to claim 4, wherein after the cleaning the storage space, the method further comprises:
when determining that the user stops performing the operation on the icon, reducing, by the terminal, the second color intensity of the icon to a reduced second color intensity according to current space release progress of the storage space using the first color intensity as a target, and displaying the icon according to the reduced second color intensity, wherein the reduced second color intensity is not less than the first color intensity.

6. A non-transitory computer-readable storage medium that stores one or more programs, wherein the one or more programs comprise an instruction, when an electronic device that comprises a display and multiple application programs executes the instruction, the electronic device is enabled to perform the method according to claim 1, and the display comprises a display screen.

7. A terminal comprising:
a display screen, a processor, a memory, and an input apparatus, wherein:
the display screen is used as an output interface between the terminal and a user, and displays visual output for the user;
the input apparatus is configured to receive an operation of the user; and
the processor is configured to perform the following steps by invoking an operation instruction stored in the memory:
instructing the display screen to display an icon on a desktop in first display mode, wherein the icon corresponds to multiple applications;
determining whether storage space used by one or more of the multiple applications is greater than a corresponding preset storage threshold value for each of the multiple applications;
in response to determining that the storage space used by one or more of the multiple applications is greater than the corresponding preset storage threshold value for each of the one or more of the multiple applications, instructing the display screen to display the icon on the desktop in a preset display mode, wherein the preset display mode is different from the first display mode;
detecting an operation performed by the user on the icon displayed on the desktop in the preset display mode and received by the input apparatus;
releasing storage space of a cleaning-required application;
when the detected operation matches a preset cleaning operation, cleaning the storage space used by the one or more of the multiple applications, wherein the preset cleaning operation is an operation of selecting and continuously shaking the icon by the user in an editing state of the desktop, and wherein an area occupied by the icon reduces in real time during the shaking until the preset cleaning operation is completed; and
displaying, in real time, space release progress of the cleaning-required application or space release progress of all applications;
wherein the cleaning-required application is an application that uses an amount of storage space greater than a preset threshold amount of storage space for the cleaning-required application.

8. The terminal according to claim 7, wherein when instructing the display screen to display the icon on the desktop in the first display mode, the processor instructs the display screen to display the icon on the desktop according to a first area; and
when instructing the display screen to display the icon in the preset display mode, the processor instructs the display screen to display the icon on the desktop according to a second area, wherein the second area is greater than the first area.

9. The terminal according to claim 8, wherein the processor is further configured to perform the following operations:
when determining that the user stops performing the operation on the icon, reducing an area of the icon according to current space release progress of the storage space, and instructing the display screen to display the icon according to a third area obtained after the reducing, wherein the third area is not less than the first area.

10. The terminal according to claim 7, wherein when instructing the display screen to display the icon on the desktop in the first display mode, the processor instructs the display screen to display the icon on the desktop according to a first color intensity; and
when instructing the display screen to display the icon in the preset display mode, the processor instructs the display screen to display the icon on the desktop according to a second color intensity, wherein the second color intensity is greater than the first color intensity.

11. The terminal according to claim 10, wherein the processor is further configured to perform the following operations:
when determining that the user stops performing the operation on the icon, reducing the second color intensity of the icon to a reduced second color intensity according to current space release progress of the storage space using the first color intensity as a target, and instructing the display screen to display the icon according to the reduced second color intensity, wherein the reduced second color intensity is not less than the first color intensity.

12. A terminal device comprising a display screen, a memory, and one or more processors configured to execute instructions stored in the memory to display a graphical user interface on the display screen and to execute multiple application programs stored in the memory, the graphical user interface comprising:
an icon displayed on a desktop of the display screen in a first display mode, wherein the icon corresponds to the multiple application programs stored in the memory;
wherein the icon is displayed on the desktop in a preset display mode in response to detecting that storage space used by one or more of the multiple application programs is greater than a corresponding preset storage threshold value for each of the one or more of the multiple applications, and the preset display mode is different from the first display mode,
wherein storage space of a cleaning-required application is released,
wherein the icon is displayed on the desktop in the first display mode in response to an operation performed by a user on the icon matching a preset cleaning operation, wherein the preset cleaning operation is an operation of selecting and continuously shaking the icon by the user in an editing state of the desktop, and wherein an area occupied by the icon reduces in real time during the shaking until the preset cleaning operation is completed, wherein space release progress of the cleaning-required application or space release progress of all applications is displayed, and wherein the cleaning-required application is an application that uses an amount of storage space greater than a preset threshold amount of storage space for the cleaning-required application.

* * * * *